(12) United States Patent
Dorfman et al.

(10) Patent No.: US 12,265,860 B1
(45) Date of Patent: Apr. 1, 2025

(54) SYSTEM AND METHOD FOR MANAGING COMPUTERIZED NODES IN COMPUTER CLUSTER ENVIRONMENTS

(71) Applicant: ZESTY TECH LTD., Tel Aviv (IL)

(72) Inventors: Isaac Dorfman, Tel Aviv (IL); Gil Bahat, Tel Aviv (IL); Tomasz Orzechowski, Cracow (PL); Arye Kfir, Kfar Saba (IL); Alon Spivack, Be'er Sheva (IL)

(73) Assignee: ZESTY TECH LTD., Tel Aviv (IL)

( * ) Notice: Subject to any disclaimer, the term of this patent is extended or adjusted under 35 U.S.C. 154(b) by 0 days.

(21) Appl. No.: 18/752,865

(22) Filed: Jun. 25, 2024

(51) Int. Cl.
  *G06F 9/46* (2006.01)
  *G06F 9/50* (2006.01)
(52) U.S. Cl.
  CPC .......... *G06F 9/5083* (2013.01); *G06F 9/5044* (2013.01)
(58) Field of Classification Search
  CPC .............................. G06F 9/5083; G06F 9/5044
  See application file for complete search history.

(56) References Cited

U.S. PATENT DOCUMENTS

| | | | |
|---|---|---|---|
| 10,558,478 B2 * | 2/2020 | Gill | G06F 11/1451 |
| 2021/0073034 A1 * | 3/2021 | Bliesner | G06F 9/5077 |
| 2022/0107814 A1 * | 4/2022 | Parab | G06F 9/4418 |

\* cited by examiner

*Primary Examiner* — Gregory A Kessler
(74) *Attorney, Agent, or Firm* — PEARL COHEN ZEDEK LATZER BARATZ LLP

(57) ABSTRACT

A system and method for allocating computer resources may include or involve maintaining or managing a pool of hibernated nodes distributed across different resource or instance specifications (such as for example zones or types), resuming a plurality of hibernated nodes, where at least two of the hibernated nodes differ by at least one resource specification, and adding one or more of the resumed nodes to a running computer cluster. Some embodiments may include various intelligent cluster scaling protocols, procedures, and operations, relating, e.g., to expanding the cluster in cases of shortage in computer resources—as well as to node migration, resource or instance optimization, evicting or deleting nodes, and the like. Some example embodiments of the invention may be applied to a Kubernetes cluster environment, and/or may include using custom software objects or custom resource definitions (CRDs) for managing resources, instances, and/or nodes.

18 Claims, 7 Drawing Sheets

Step 410: resume hibernated nodes associated with different specifications

Step 420: add resumed nodes to a running computer cluster

SYSTEM AND METHOD FOR MANAGING COMPUTERIZED NODES IN COMPUTER CLUSTER ENVIRONMENTS

FIELD OF THE INVENTION

The present invention relates generally to the field of cloud and/or container computing and orchestration—and more specifically to the dynamic management of computing resources in cloud computing environments.

BACKGROUND OF THE INVENTION

The field of cloud computing has transformed the way computer programs and applications are deployed and managed. Various cloud platforms have enabled users to manage diverse workloads while providing various solutions for resource scaling and allocation. However, achieving optimal performance, scalability, and cost-effectiveness in cloud computing environments remains a long-standing challenge.

Virtual machines (VMs) are known to support the efficient allocation of computer resources by, e.g., enabling to adjust resource allocation based on varying workload requirements. There is a growing need for establishing a robust framework for utilizing VMs in cloud computing environments, which may allow, e.g., improving cloud resource management and scaling capabilities.

SUMMARY

Embodiments of the invention may provide systems and methods for managing and/or allocating computer resources which may include or involve maintaining or managing a pool of hibernated nodes distributed across different resource or instance specifications (such as for example zones or types), resuming a plurality of hibernated nodes, where at least two of the hibernated nodes differ by at least one resource specification, and adding one or more of the resumed nodes to a running computer cluster.

Some embodiments may include various intelligent cluster scaling protocols, procedures, and operations, relating, e.g., to expanding the cluster in cases of shortage in computer resources—as well as to node migration (e.g., using shadow representations of nodes), resource or instance optimization, creating, evicting or deleting nodes, and the like. Some example embodiments of the invention may be included in, or applied to, a Kubernetes cluster environment, and/or may include using custom software objects or custom resource definitions (CRDs) for managing resources, instances, and/or nodes.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Figure 1:
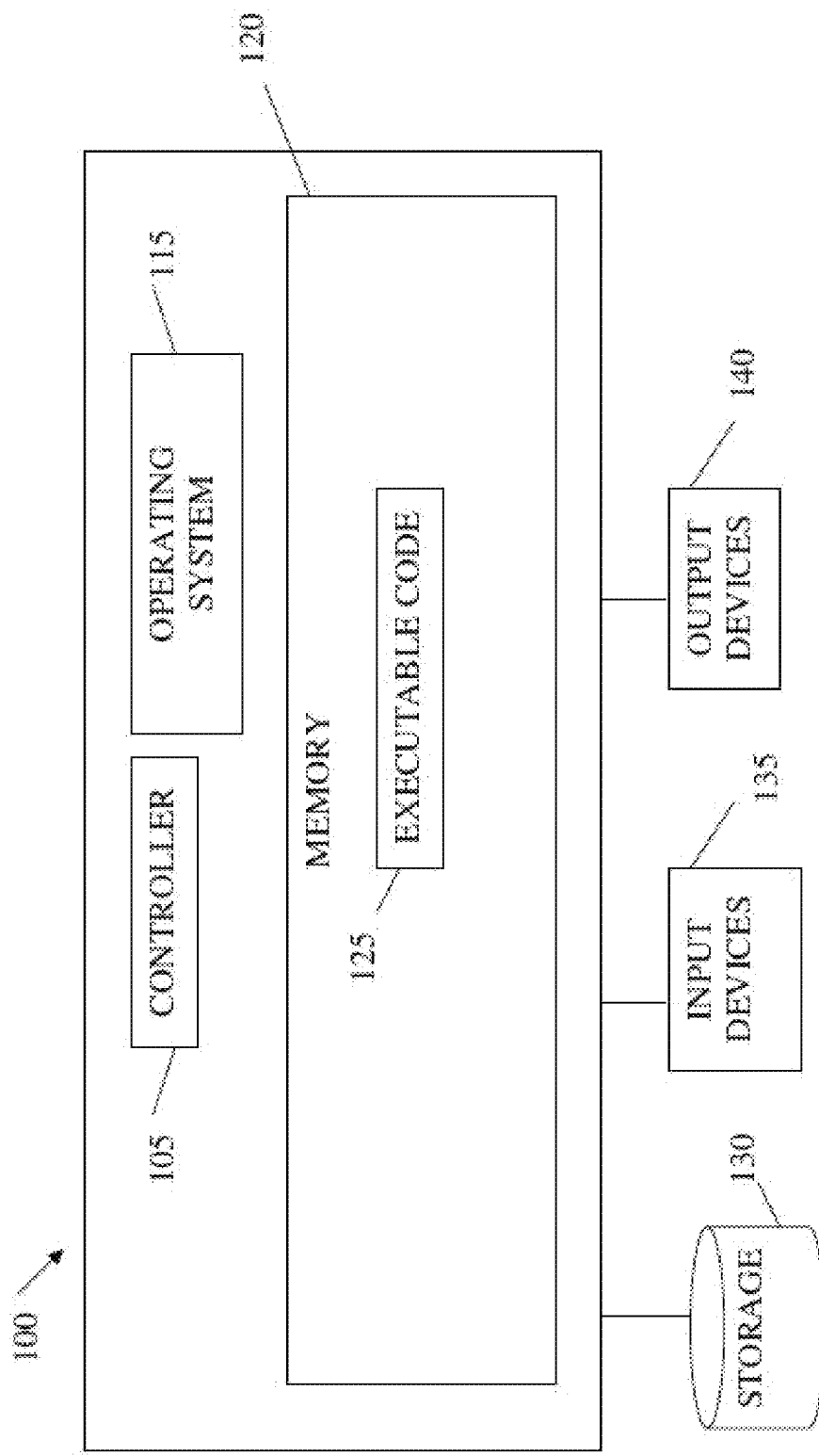
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

Embodiments may provide systems and methods for the dynamic allocation of computer resources, and more particularly to the management of virtual machines (VMs), in computer processes—taking place, e.g., in computer cluster environments (which may, for example, be actively running and using resources, which may collectively be referred to herein as a "running cluster").

A virtual machine (VM) as used herein may refer to, e.g., software-based emulation of a physical computer. Virtual machines broadly used for various context relating to management of computerized resources. In one example, multiple operating systems may run on a single physical machine, known as a host, in a concurrent manner—using multiple corresponding virtual machines. In this example, each VM may operate as an independent and isolated environment (e.g., unrelated or uncoupled to other VMs) with its own virtualized hardware, including CPU, memory, storage, and network interfaces—that may correspond to a set and/or parts of physical hardware resources (e.g., some CPU cores, memory resources, and the like—of a physical personal computer or high-performance cluster). Additional or alternative examples are known in the art.

Virtual machines may enable the efficient allocation of physical resources. Multiple VMs can share the resources of a single host, and these resources may be dynamically adjusted based on demand—which may be desirable, e.g., in the contexts relating to cloud computing where various computer resources may be allocated and used, for instance, for carrying out computer based programs and procedures for various users or parties in a simultaneous or concurrent manner.

Hibernation and resumption as used herein may refer to the process of saving a given state of a VM, and then later restoring it to that saved state—which may, e.g., be analogous in hibernation and resumption processes seen in traditional physical computers but are applied to virtualized environments.

Hibernation of a VM may include or involve capturing its current state, including the contents of its memory (RAM), the processes running on it, and the like, and saving it to a file on computer storage (e.g., on a specific physical machine, or in a manner distributed between several machines). The VM may then be powered off. Such a hibernation process may allow the VM to be quickly resumed later without a full startup sequence, as it can be restored to the exact state it was in before hibernation. As known in the art, hibernating a given VM may provide a faster recovery time compared to starting the VM from scratch.

Resuming a VM may include or involve loading the saved state from the hibernation file back into computer memory and restoring the VM to its previously saved operational state. The VM may continue its operation from the point at which it was hibernated.

An "instance zone" or "zone" as used herein may refer for example to a physical data center or a geographical region or location where cloud resources, such as VMs (which may also be referred to as "instances"), are deployed and managed; such zones are one example of resource specifications which nodes may be associated with. As known in the art, cloud providers may have multiple data centers distributed, e.g., across different geographical regions, or across the entire globe—which may be useful for enhancing or addressing availability, redundancy, and disaster recovery capabilities when running computer jobs. In one example use case, when deploying resources in the cloud, users may choose the specific data center or region (comprising, e.g., multiple data centers) where their VMs may be provisioned. The choice may allow, e.g., for better latency, compliance with data residency regulations, and improved fault tolerance.

An "instance type" or "type" as used herein may refer for example to configurations and/or specifications of machines and/or VMs (and/or nodes representing them—see further discussion herein). These configurations include specifications such as the amount of virtual CPU (vCPU), memory (RAM), storage, and networking capacity. Different instance types may be used and/or be optimized for various use cases, providing a range of features such as, e.g., ones relating to performance, scalability, and the like, as known in the art. In one example use case, a user can select an instance type that may align with the requirements of relevant computer jobs and/or applications. Compute-intensive workloads, for instance, may benefit from instances with high vCPU and memory, while storage-intensive applications might require instances with ample storage capacity. An instance or VM may be executed on a physical machine corresponding or supporting the relevant instance type (for example, a vCPU-intensive instance type may be deployed or executed on a physical machine having appropriate CPU resources).

Machines (e.g., physical or virtual) and/or nodes representing them (see further discussion herein) may thus be assigned and/or be characterized various resource or instance specifications, such as for example by belonging to a specific zone or type. For example, a VM running on a physical machine found in New York and having 5 vCPU cores and 5 gigabytes RAM, may be associated with zone A and type X (and thus associated with this resource specification); a physical machine found in New Mexico and having 5 CPU cores and 5 gigabytes RAM may be associated with zone B and type X; a VM found in New Mexico and having 6 CPU cores and 6 gigabytes RAM may be associated with zone B and type Y, and so forth. Additional and alternative definitions and/or examples for resource or instance zones and/or types may be realized and used in different embodiments of the invention. In some embodiments, a machine or instance, and/or a machine or instance of a given zone or type may be pooled or retrieved, for example, from a given cloud or resource provider or platform through a dedicated application programming interface (API). Different procedures for retrieving and defining resource or instance zones or types are known in the art.

Resource scaling (or simply "scaling") as used herein may refer to the dynamic adjustment of computing resources (including, for example, the allocation of VMs and/or corresponding physical machines) to execute computerized applications, jobs, or tasks. Scaling may be performed, for example, based on the current demand or requested workload for which computing resources may be needed—which may be or may include, e.g., a plurality of jobs or tasks (and/or, in the nonlimiting example of the Kubernetes open-source container framework, a plurality of containers or pods) submitted by or associated with corresponding users or clients, as known in the art. Additional or alternative forms and/or paradigms and/or contexts for scaling using embodiments of the invention may be realized. Frameworks other than the Kubernetes framework may be used.

Some embodiments of the invention may consider or be applied to a cloud resource management environment, such as for example the Kubernetes open-source container orchestration platform and environment and/or additional tools in the Amazon Web Services (AWS) environment. One skilled in the art would recognize additional or alternative platforms and environments may be considered in different embodiments of the invention, a Kubernetes environment should therefore be considered a nonlimiting example for a computer cluster environment.

Accordingly, in some embodiments, the running computer cluster is a Kubernetes cluster.

A computer cluster, such as for example a Kubernetes cluster, as referred to herein may include several parts such as, e.g.: a control plane—which may be a component in charge of documenting and/or storing the state of the cluster and controlling it, and nodes—which for example may be or may represent computerized workers or machines (physical or virtual, e.g., a VM) which may run various workloads.

As further described herein, some embodiments of the invention may manage a plurality of nodes, or abstractions of computerized nodes—which may be referred to herein as QNodes.

In the nonlimiting example of a Kubernetes cluster, a "pod" as used herein may refer to a logical unit that encapsulates and/or manages one or more "containers" within the Kubernetes ecosystem or environment. A "container", on the other hand, may be the executable units that encapsulate, e.g., application code and dependencies—and that may require computerized resources for their execution and handling. Embodiments of the invention may thus be applied to manage computational resources in a computerized cluster—for example by allocating or assigning pods and/or containers to appropriate nodes that may execute them.

It should be noted, however, that examples used herein with reference to the Kubernetes environment should be considered nonlimiting, and that embodiments of the invention may similarly applied to, e.g., cluster environments unrelated to, or independent from, the Kubernetes framework.

Embodiments may create and/or use a dedicated resource scaling object, which may be referred to herein as a QScaler object (or simply QScaler for short)—which may be used for example for managing cloud and/or computerized cluster resources in real time based on varying conditions (such as for example varying demand for computer resources, including a varying flux of scheduled computational jobs and/or job requests). In some embodiments of the invention, the QScaler may offer various desirable functionalities, e.g., including:

- Managing resources and instances from multiple zones and types.
- Preventing a potential failure associated with relying on specific resource types or zones (e.g., availability, zone, or type "outages"—which in some examples may occur during "peak times" or network overloads for a given zone or geographic location, and/or, for example, where specific resources or machines associated with a given zone or types may be unavailable or heavily used).
- Hibernating and/or resuming a plurality of VMs across different zones or types.
- Managing or maintaining a pool or set of VMs, which may be, e.g., distributed between the desired zones or types (in some nonlimiting examples, as demonstrated herein, VMs may be equally distributed across zones and types).
- Performing and/or offloading downscaling operations—which may be or may include operations related to reducing or optimizing the number or capacity of resources allocated to a system or application—using dedicated components such as for example cluster autoscalers (such as for example the Kubernetes based NodeGroup Cluster-Autoscaler, Karpenter, and Spot Ocean autocscalers).

Additional or alternative features and/or functionalities may be realized—see also further in-depth discussion herein.

In some embodiments of the invention, the QScaler may be used for accelerating a given computerized cluster's resource scaling speed, which may for example be used for "protecting" the system or cluster from unexpected disruptions and/or interruptions and ensuring that jobs, containers or pods are not hampered or harmed. In this context, scaling speed may refer to or may describe the amount of time needed for allocating and/or provisioning additional computer resources for running jobs (and/or for executing containers or pods) for which, at a given point in time, there may be no sufficient computer resources available.

Following resource scaling operations, some embodiments may optimize resource or instance types for improved performance—for example in combination with existing upstream autoscalers which may be used or included in the cluster protected by relevant embodiments of the invention. Such optimization or "offloading" process may include unique procedures for relevant autoscalers, such as for example further described herein.

Embodiments of the invention may thus improve previous technologies for cloud resource management, by providing an intelligent, strategic and standardized, VM hibernation and resumption based framework for cloud resource scaling—which allows for robust and quick responsiveness and adaptability for varying demand for computer resources and/or conditions or unexpected failures among different zones or types.

Some embodiments may include maintaining a pool or set of hibernated VMs and resuming more VMs than, e.g., requested or needed for a given computational task. Embodiments may then allow or permit only a subset of the resumed nodes to continue running and join the relevant cluster, and may command the remaining nodes to return to hibernation. This may prove useful, e.g., due to the variability in the time it may take a given VM (e.g., of a given zone or type) to resume from a state of hibernation. Embodiments may then choose or select the first nodes to be resumed and running in order to provide fast, responsive and adaptive scaling for computerized clusters and/or cloud platforms. In some embodiments, maintaining a pool of hibernated VMs may include keeping or storing the storage and/or memory of a plurality of VMs in resources or instances which are executed or stored in different zones from each other—and/or saving disk images of a plurality of VMs in resources or instances found in multiple zones or belonging to different types. This may prove useful, for example, in a case where entities in a given zone become dysfunctional (e.g., power outage in a given zone A)—and where hibernated VMs may thus be resumed in a location in different zone by some embodiments of the invention. In some embodiments, saving or storing disk images may include or involve, e.g., sending or transmitting the relevant images and/or additional data or metadata over a communication or data network to the relevant resources in locations in the desired zones, and the like—as known in the art.

Some embodiments may utilize VM hibernation to add, and/or to accelerate the adding of a new VM to a Kubernetes cluster (thus expanding the cluster), for example during "spike" or "peak" times—which may be or may refer to a point in time where there are insufficient computer resources available in the cluster for handling requested computer processes. In some embodiments, adding new VMs to a computer cluster or expanding the cluster may include or involve maintaining a pool of hibernated VMs and, when there is a demand for additional VMs, resume a hibernated VM from the pool of hibernated VMs instead of booting a VM from scratch.

A node as referred to herein may be or may represent a physical machine, a VM, or a hibernated VM. In the nonlimiting example of a Kubernetes cluster, a node may be or may execute "kubelet", which may be a node-level agent that is in charge of executing pod requirements, managing resources, and the like, as known in the art.

In the nonlimiting example of a Kubernetes cluster, some embodiments of the invention—including for example some of the objects, components and/or protocols and procedures described herein (including, e.g., the QNode, QBaker, and QScaler objects)—may be implemented using custom resource definitions (CRDs) within the Kubernetes environment and/or application programming interface (API). Additional or alternative objects or custom resources may be used in different cloud environments.

In some embodiments, a plurality of hibernated nodes are managed by a first software object; wherein the adding of one or more newly created nodes is performed by the first software object; and wherein the resuming of one or more nodes is performed by a second software object, the second software object resuming nodes managed by the first software object.

For example, some embodiments of the invention may include or involve a functional division between a plurality of software objects or CRDs. For example, in some embodiments, and as further described herein—a pool or plurality of hibernated nodes may be managed by a first software object (such as, e.g., QBaker), which may also be responsible for creating new nodes, and adding newly created nodes to the pool of hibernated nodes, while resuming of nodes and/or adding resumed nodes to a running computer cluster may be performed by a second software object (e.g., QScaler and/or ResumeTask), where the second object may for example be configured to resume nodes managed by the first object (e.g., as demonstrated in nonlimiting examples herein, a QScaler and/or ResumeTask may "own" or be assigned a QBaker(s), and may accordingly be responsible for resuming nodes managed by or associated with that QBaker(s)). It should be noted that additional or alternative distributions of computer tasks among software objects, and/or additional or alternative objects among which tasks may be distributed may be realized and used in different embodiments.

Embodiments of the invention may resume one or more nodes of a plurality of hibernated nodes—where some of hibernated nodes may be associated with different resource or instance specifications, according to the protocols and procedures described herein.

In some nonlimiting examples provided herein, resource or instance specifications may include or may correspond to different zones and/or types the relevant nodes may belong to, or may be associated with. Resource or instance specifications may therefore include a plurality of different zones/types such as for example described herein—and nodes managed/hibernated/resumed by embodiments of the invention may differ in the zones or types associated with them. It should be noted that additional or alternative resource or instance specifications or characteristics may be used in different embodiments of the invention. In the context of the present document, "resource" and "instance", as well as "resource specifications" and "instance specifications", may be used interchangeably.

After a VM is hibernated, its instance type and zone may not be changed (e.g., it may already be allocated to, stored or saved in, specific machines and/or resources and/or instances of a specific zone/type). During peak times, however, some instance types, for example, may become unavailable at specific zones—and requesting the resumption of relevant instances of that zone/type may prove prohibitive. Additional or alternative examples of deficiencies, or unexpected and undesirable failures or pitfalls associated with a specific zones/types, as well as with additional or alternative characteristics of resources and/or instances may be realized and be addressed and/or mitigated by different embodiments of the invention.

In order to improve a given computer cluster's robustness and resilience, Embodiments may manage or maintain a pool of hibernated VMs that may include a plurality of VMs spread or distributed across different zones and instance types (e.g., equally, although alternative distributions may be used in different embodiments).

Embodiments of the invention may define and use custom computer program objects, modules, or components which may execute or carry out some of the protocols and procedures described herein. Two nonlimiting example component classes may be referred to herein as QBaker, and QNode.

In some embodiments, a QNode may represent or correspond to a VM across its entire lifecycle, for example including the initial creation of the VM, events of hibernating and/or running and functioning as a node in a given cluster, and the like. In some embodiments relating to the Kubernetes container environment, and as part of creating or establishing QNodes, embodiments may boot, pool, or create a machine or instance (e.g., using an API from a cloud or resource provider such as for example described herein), which may be configured to run a plurality of desired jobs and/or computer processes but, e.g., not run a kubelet. Embodiments may then hibernate the created machine or instance. After resumption, for the machine to become a fully operational Kubernetes node, embodiments may automatically command or request the machine or instance (which may include for example sending or transmitting a corresponding command to using the API of the relevant provider, as known in the art) to run kubelet. Some embodiments of the invention may create, write, or update an entry or a plurality of entries that may store a state for a given QNode (such as for example QNode X: "hibernated", "resumed", etc.). In some embodiments, the state entry may be included in CRDs for relevant entities and/or classes, such as for example under a "QNodePhase" field, variable, or type definition and as described herein—and/or in a dedicated database storing node states. Additional or alternative formats and/or approaches for storing or documenting software or hardware object states may be used in different embodiments. Based on the value of the relevant state entry, object controllers such as for example further described herein may determine or command a given QNode to perform various computer operations. Operations may be or may include, for example: creating an instance for the QNode (e.g., if such an instance does not yet exist); hibernating the QNode or instance (e.g., if its hibernation script has terminated and yet the QNode is not hibernated); resuming the relevant instance if the QNode is in a hibernated state or phase and if there is a need for additional computer resources (see further discussion herein), and the like. In some embodiments of the invention, QNodes may be linked or coupled with Kubernetes nodes using a dedicated CRD state entry or field describing a node's status and specifying an identifier of corresponding cloud provider of the node or instance it manages—which may for example be set to support a system or platform according to different embodiments of the invention. In some embodiments, a node object may be created subsequent to a prior creation or definition of QNodes, which may be performed relatively late in a given QNode's lifecycle. Additional or alternative relationships between QNodes and computerized nodes in, e.g., various cloud platforms and environments may be realized and used in different embodiments of the invention. In accordance with the discussion herein, various similar state entries databases describing states of resources and/or instances and/or software objects may generally be used in different embodiments of the invention. Additional or alternative state monitoring schemes or procedures known in the art may also be used.

In some embodiments, a QBaker may represent, correspond to, or manage a pool or plurality of hibernated QNodes which may have or may include a prespecified or predetermined capacity or capacities associated with, e.g., a plurality of zones and instance types. In some embodiments, zones and types for a given QBaker (e.g., in which hibernated VMs may be kept or maintained) may be selected or chosen based on default system configurations (as may be defined, e.g., in operational policies in a given cluster autoscaler), and/or specifically requested by a user or system administrator. Additional or alternative selections or configurations may be realized in different embodiments.

Some embodiments may include adding one or more newly created nodes to the plurality of hibernated nodes, the adding based on a capacity for one or more of the resource specifications. In some embodiments, the plurality of hibernated nodes are managed by a first software object, and the adding of one or more newly created nodes is performed by the first software object.

For example, some embodiments may include managing nodes, which may include, e.g., creating new nodes (such as for example QNodes) representing computer resources or instances, and adding a plurality of newly created nodes to the pool or plurality of hibernated nodes based on a capacity or capacities, e.g., for instance zones and types. In some embodiments, this may be achieved or performed by the QBaker, e.g., in a procedure or process referred to herein as "node baking". Embodiments may provide a "node baking" process, which may include, e.g.:

A QNode object may be created, which may specify the desired zone and instance type.

A QNode controller (which may be, for example a Kubernetes controller, as known in the art—although different controllers and relevant methods may be used for software objects according to different embodiments of the invention) may create or pool a corresponding VM for it.

The VM or node may be booted and may then be hibernated (e.g., by running a default startup script).

The QNode controller may monitor the VM, and when the VM becomes hibernated, the controller may update a state or phase of the QNode to "hibernated".

A QBaker object may be configured to include, e.g.:

A list of zones (e.g., according to the nonlimiting example provided herein, zones A and B).

A list of instance types (e.g., types X and Y)

A number or capacity of QNodes by zone and instance type which may be considered as "belonging to", or be supervised by that particular QBaker (such as for example 5 QNodes of zone A and type X; 5 QNodes of zone A and type Y; 5 QNodes of zone B and type X; 5 QNodes of zone B and type Y).

A QBaker controller may constantly or continuously monitor the QNodes in the system (as, e.g., documented in corresponding CRD state entries describing states of nodes or QNodes such as for example described herein, which may be updated on a regular basis, e.g., every X seconds), and may for example ensure that the desired capacity for QNodes belonging to the QBaker is met.

If, for example, the QBaker detects that the number of QNodes belonging to the QBaker and associated with a specific instance type is lower than the desired number or capacity for a given zone, the QBaker may create a QNode object with the desired instance type in the relevant zone (e.g., to satisfy or meet the desired number of nodes of the relevant type in that zone; QNode creation may then follow, e.g., nonlimiting examples provided herein).

Some embodiments of the invention may include resuming one or more nodes of a plurality of hibernated nodes, at least two of the plurality of hibernated nodes associated with at least two different resource specifications. In some embodiments, the resuming of one or more nodes is performed by a second software object, the second software object resuming nodes managed by the first software object.

For example, embodiments may resume one or more nodes of a plurality of hibernated nodes. Some embodiments may manage QNode resumption by a dedicated resuming object (which may be referred to herein as a QScaler software object, or QScaler for short) which may define or specify, for example:

A plurality of labels for pods that may be under its protection, or for which it may be responsible (for example, embodiments may label pods using a label such as for example pod:x/ . . . /qscale: true. Additional or alternative linking or labeling schemes may be used and, e.g., determine priorities for different pods and procedure for controlling them using different embodiments of the invention).

The QBaker or QBakers of which hibernated QNodes it may use to protect or manage the cluster. In some embodiments, this may be specified, e.g., in a corresponding state field or entry in the relevant QScaler specifications or configurations including an identifier for the QBaker for which it may be responsible—and/or in relevant specifications, schema, or configurations of a given QBaker. Additional or alternative interobject linking techniques and procedures may be used in different embodiments.

A maximum number of QNodes that may be running, or that may be allowed to run at the same time (e.g., 100 nodes).

In some embodiments, QScaler may operate according to an example workflow such as: (1) a QBaker may create a QNode object, e.g., if no QNodes exist. (2) A QNode controller (such as, e.g., a Kubernetes controller) makes sure or verifies that new QNodes and/or corresponding resources/instances reach or are in hibernated phase, which may include, for example: (2.1) First creating instances or VMs if needed; (2.2) monitoring or detecting when an instance's startup script finished or terminated (as, e.g., reflected in a corresponding state entry or field describing QNode, node or instance states, such as for example discussed herein), and automatically requesting the cloud provider (e.g., using a corresponding API) to hibernate the underlying VM (2.3) monitoring and detecting when hibernation finished (e.g., according to a corresponding state entry or field) and marking the QNode as hibernated. (3) Resumption may then take place and may include, e.g.: (3.1) A ResumeTask controller (e.g., a controller for a ResumeTask object such as for example described herein) may select or choose QNodes to resume, and changes their state or phase accordingly, e.g., to "RequestingResume"; (3.2) Another, separate controller (e.g., a QScaler controller, or a controller for a QScaler object) requests the cloud provider to resume the underlying VM; (3.3) Once it is detected that the node has resumed, (e.g., the kubelet on the VM has started or has been initiated) mark the relevant QNode as running. In some embodiments, the resumed nodes, or nodes selected by the relevant software object to be resumed, may have different resource specifications, where for example at least two resumed nodes may belong to or be associated with at least two different instance or resource zones or types. For example, resumed nodes or nodes to be resumed may be selected by the relevant software object based on specifications for relevant nodes, or based on resource specifications such as zones or types that may be associated with relevant nodes such as, e.g., shown in code examples provided as an appendix to the present disclosure. For example, a QScaler, QBaker, ResumeTask controller, and the like, may search or lookup a state entry or field of nodes (e.g., by looking up or searching nodes and/or CRDs currently running or executing on the cluster, and their associated CRD descriptions or specifications which may include state fields or entries such as, e.g., described herein) including their resources specifications, then select and/or resume nodes belonging to at least two zones and/or types. Additional or alternative parameters defining a QScaler or included in or specified by a QScaler, as well as workflows for managing nodes by a QScaler, may be included in different embodiments of the invention.

The resuming and/or adding of nodes to a running cluster may be triggered by various triggering conditions or events. In some embodiments of the invention, the resuming is performed in response to at least one of: a shutdown notice for a running computer resource, and a pod marked unschedulable, wherein the pod specifies resources unavailable in the running cluster.

For example, in some embodiments, the resuming of nodes may be performed in response to, e.g., a shut down notice for a running computer resource or instance, and/or in response to a pod marked or labelled unschedulable—which may, e.g., refer to a case where a pod specifies resources unavailable in the running cluster. A QScaler may, e.g., support two triggers, or may be triggered by two different triggering conditions or events to initiate a QNode resumption process such as, e.g., further described herein. Triggering events may be or may include, for example:

Unschedulable pods: in some embodiments (such as for example ones relating to the Kubernetes environment), a pod may include or specify an amount of resources it may require, as well as the conditions a node must meet in order to be able to run it. In one example, a pod may require 4vCPU cores and a condition that a node running it must belong to zone A (additional or alternative examples may be realized). When a pod is created, a Kubernetes job scheduler may check all the nodes in the Kubernetes cluster, and may seek a node that may be capable of running it (e.g., a node matching the specifications just mentioned). If the scheduler finds one, it may assign it to the pod under consideration. Otherwise—if, for example, the pod specifies or requests resources that are unavailable in the running cluster—the scheduler may mark the pod as unschedulable. When a pod is marked as unschedulable, it may signify that the relevant cluster does not have enough nodes that may run or execute the relevant pod. For this reason, for example, a QScaler may be triggered to increase the number of nodes in the cluster when at least one pod is marked unschedulable. The QScaler may then create an object of type "ResumeTask" that calculates and/or specifies the number of QNodes that need to be resumed. The number of QNodes may be determined by summing the total resources or total amount of resources requested for all unschedulable pods, and calculating the minimal number of QNodes that may be capable of running all of them. Based on the calculated number of QNodes, QScaler may resume one or more nodes and add them to the cluster under its supervision or management. In one nonlimiting example relating to the Kubernetes environment, a given pod may have or may be associated with a "requests" field or database entry which specifies the amount of resources attributed to it (e.g., 3 vCPUs, 20 GB vRAM, etc.), and nodes may have or may be associated with an "allocatable" field or database entry that may specify the amount of resources which may be allocated from them (e.g., allocatable(Node 1)=2 vCPUs, 15 GB vRAM; allocatable(Node 2)=3 vCPUs, 5 GB vRAM, and so forth). Some embodiments may thus resume the least amount or minimum number of nodes having "allocatable" capacity equal to or larger than the amount of resources "requested" by the unschedulable pod (for example, if the unschedulable pod requests 3 vCPUs and 20 GB vRAM currently unavailable in the cluster, embodiments may have to resume both Nodes 1 and 2 in this particular example in order to schedule the pod, as none of Nodes 1 and 2 have enough allocatable vRAM to run or execute the pod on its own).

Spot interruptions: spot instances may refer to a model of VM reservation and/or that may be used in some embodiments of the invention, or in some environments in which some embodiments of the invention may be embedded (such as for example the nonlimiting example of Amazon Web Services, or AWS). The spot instances model may enable customers to manage VMs given a condition that they may be shut down or interrupted prematurely with, e.g., a two-minute notice (which may also be referred to as a "grace period"; any alternative time period, and/or conditions or criteria for premature shutdown may be used). Resources for which a conditional shutdown or interruption is given may be referred to as spot instances. In some embodiments, the QScaler may monitor shutdown or interruption notices or notifications, and if it detects that a node running on a spot instance is about to be interrupted, the QScaler may be triggered to resume a QNode to replace the relevant spot instance. In some embodiments, the monitoring of spot instances and/or corresponding shutdown or interruption alerts or notifications may be performed using the "ResumeTask" object. In some embodiments, QScaler may monitor nodes and/or QNodes by checking or searching relevant state and/or database fields or entries describing states of nodes or QNodes such as for example described herein, e.g., every X minutes. In accordance with the discussion herein, relevant CRD state entries or fields and/or dedicated databases and node or QNode states may be updated in real time, e.g., based on information provided using an API of a given resource provider—e.g., every Y seconds. Additional or alternative procedures and protocols for monitoring nodes and/or instances and/or resources may be used in different embodiments. In some nonlimiting examples, monitoring spot interruptions may include monitoring, polling, searching, or checking a corresponding message queue using which alerts or notifications for spot interruptions may be sent—for example on a regular basis such as, e.g., described herein. An example such message queue and/or spot interruption alert mechanism may be or may include, e.g., the Amazon Simple Queue Service (SQS) and/or the Amazon Web Services (AWS) EventBridge event routing application. Additional or alternative mechanisms may be realized.

Additional or alternative triggering mechanisms and/or triggering events may be used in different embodiments of the invention.

Some embodiments of the invention may include adding one or more of the resumed nodes to a running computer cluster. In some embodiments, the at least two different resource specifications include at least one of: at least two instance zones, and at least two instance types. In some embodiments, one or more of the added nodes are first resumed nodes.

For example, in some embodiments, the resumed nodes to be added to the cluster may be or may include the nodes that were resumed first, or the first nodes to be successfully booted or resumed (also termed first resumed nodes). Since the time that may be required for a given cloud resource management environment (such as for example AWS) to allocate a VM may depends on the zone and instance type of that VM—it may be desirable to ensure that a VM may be available or may be resumed as soon as possible (e.g., with minimal latency or delay). Some embodiments may thus resume nodes and add them to a corresponding cluster by providing an intelligent VM resumption mechanism (which may be referred to herein as "IntelliJoin") and resume multiple instances from various, multiple or different zones and instance types, connect instances that were resumed first to the cluster, and return the rest of the (e.g., later) resumed instances to hibernation. In some embodiments, the IntelliJoin mechanism or procedure may be carried out by the QScalar object, or by a ResumeTask object or controller created and/or managed by a QScalar object. In one example, ResumeTask may specify the number of desired running QNodes, or the number of QNodes which should be added to the cluster (which may be calculated, e.g., per relevant specifications for a given pod such as for example described herein)—as well as a number of QNodes that may "race" for resumption (and from which only some will be added to the cluster). ResumeTask may then, e.g.:

a. Send a <desired running count> (e.g., 5) number of messages to a relevant message or event queue (such as for example the Amazon Simple Queue Service or SQS queue)—which may specify or allow a number of <desired running count> events of pulling or adding a node or QNode to the cluster.

b. Resume a <racing instance count> (e.g., 7) of QNodes across a plurality of instance type and zone. Note <racing instance count> should always be larger than <desired running count>.

c. By requiring that only resumed nodes may receive messages from the message queue—resumed QNodes may be thought of as trying to "catch" a message from the queue, and only the first <desired running count> resumed nodes (e.g., 5 among 7 QNodes) may manage to do so, and therefore be connected and/or added or joined to the cluster. The rest of remaining QNodes may be hibernated or may return to hibernation.

d. ResumeTask or a controller subcomponent within the ResumeTask object may monitor the cluster and relevant instances (such as for example Amazon "EC2" instances or virtual servers, although other examples may be realized), and may check or search for updates from the resuming QNodes, and may update a state of the ResumeTask object accordingly, e.g., to signal or determine that the desired number of nodes or QNodes was joined to the cluster and that the process was carried out successfully.

Additional or alternative node resumption procedures or processes may be used in different embodiments of the invention.

Figure 2:
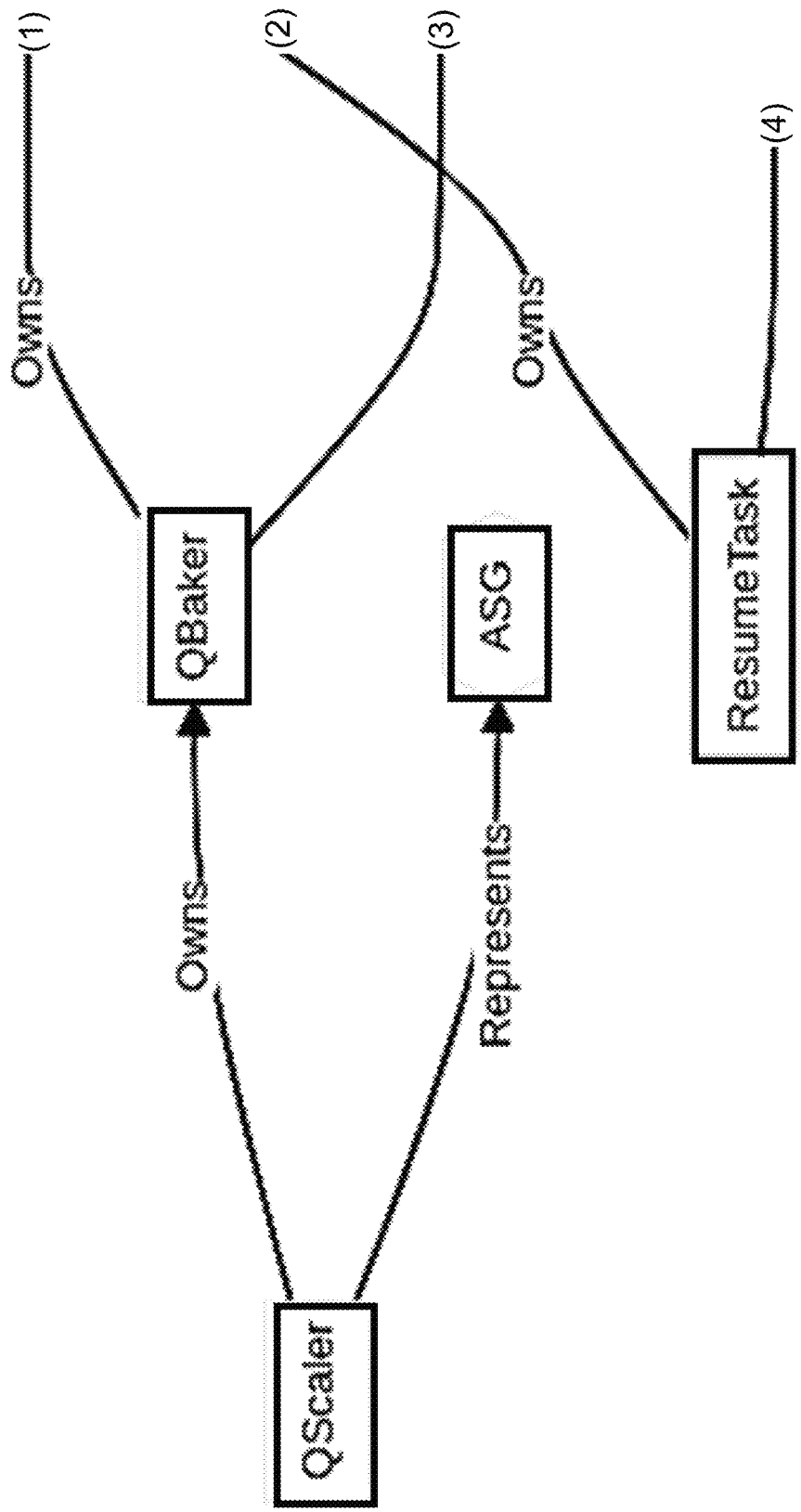
FIG. 2 shows an example relationship between computerized node management related objects according to some embodiments of the invention.
Figure 2:
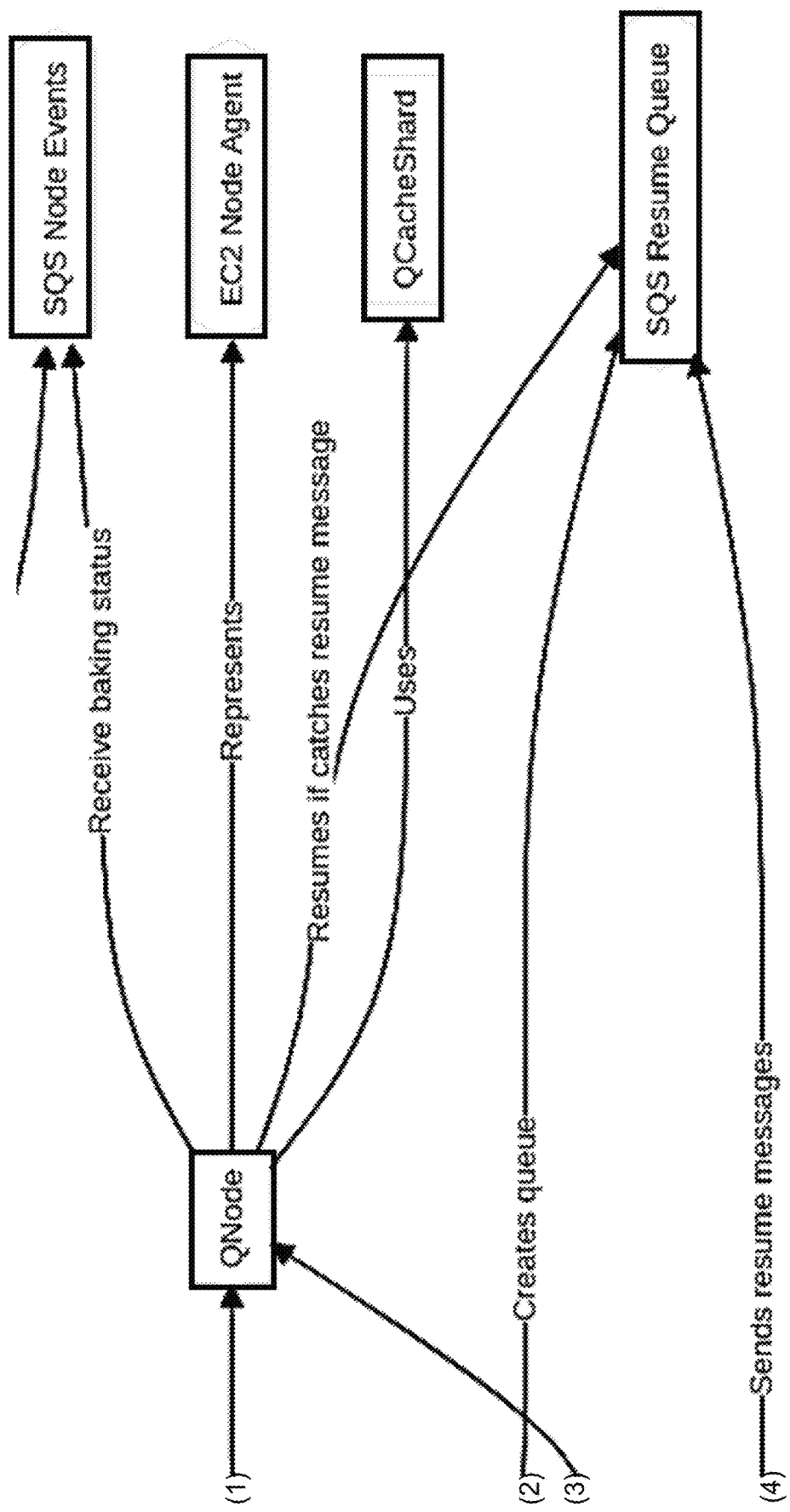

FIG. 2 shows an example relationship between computerized node management related objects according to some embodiments of the invention. According to some example embodiments:

A QNode object or entity may represent a VM across its lifecycle.

A QBaker object or entity may manage a group or set of QNodes during their initialization process until they reach a "hibernated" state or phase.

A ResumeTask object or entity may be a temporary object or entity that may facilitate the resumption of QNodes, e.g., as part of the intellijoin mechanism such as for example described herein A QScaler object or entity may have various roles, for example:
  Checking if a corresponding QBaker for exists, e.g., for a corresponding group of nodes. If not, the QScaler may create the QBaker for the relevant nodes.
  Resuming QNodes, for example by creating a ResumeTask.

Some embodiments may include a hierarchy between software objects or entities, such that for example a QScaler may "own" QBaker and/or ResumeTask objects, and such that QBaker and/or ResumeTask objects may "own" a QNode. In such manner, a first entity "owning" a second entity, or a first class of entities "owning" a second class of entities, may for example provide credentials for, or allow creating the second entity by the first entity, and/or updating the state of the second entity, providing commands to the second entity, and the like. In one example, a QBaker may for example change the state of a QNode to "hibernated", and a QScaler may create or delete a QBaker, e.g., if no nodes are assigned to it (if at least one node is assigned to a given QBaker, the QScaler may do nothing and avoid deleting the QNode). Additional or alternative entities and/or relationship between entities may be included and used in different embodiments.

In some embodiments the QScaler component may be integrated with cloud or cluster autoscaler components or upstream cloud managers—e.g., to provide some or all of the features and/or processes described herein in order to improve various functionalities of the corresponding cluster (such as for example improving its resilience to failures as described herein).

In some embodiments, a QScaler may be configured to automatically scan and detect existing node groups or groups of nodes (also referred to as NodeGroups), in a given cluster (e.g., based on relevant CRD entries and/or databases describing nodes such as for example described herein)—and to create, for each relevant group, another dedicated QScaler. In some embodiments, the QScaler created may have a configuration or setting similar or identical to the original QScaler by which it was created. In one nonlimiting example relating, e.g., to the Karpenter autoscaler (see further discussion herein), a Karpenter nodegroup may be referred to as a "provisioner" and may be or may be included in a dedicated Kubernetes CRD. The provisioner may specify the instance zones and/or types for the relevant nodes as well as a maximum combined resource usage. Embodiments—and, e.g., a specific QScaler—may scan or search for all provisioner objects in a given cluster (e.g., as documented in relevant CRD fields or entries and/or in databases within the Kubernetes environment) and may create, for each such object, a corresponding QScaler. The newly created QScaler may include, e.g.: X instance types which may be a subset of the instance types configured in the provisioner; a subset of Y of the zones configured in the provisioner; and an instance count Z so that with the aforementioned instance types, the combined resources of all nodes or QNodes may be for example as twice as large as the maximum resource usage specified in the provisioner. Additional or alternative protocols or procedures for automatic QScaler and/or additional software object creation (including, but not limited to, the software objects discussed herein) may be used in different embodiments of the invention.

In some embodiments, QScaler may detect resource shortage and add nodes to the cluster in real time—which may be referred to herein as an "adoption" mechanism. In some examples use cases, this may include or entails compromising on having or finding the optimal instance type for long term operation—e.g., in contrast to existing technologies that focus on finding the optimal instance type at the expense of scaling speed. In this context, it should be noted that various methods and/or procedures for determining or calculating resource optimality (e.g., how and what computational resources are best utilized to perform or execute a computerized task, pod, and the like) are known in the art and may be used or implemented in different embodiments of the invention (in some examples, they may be included and/or used by a relevant cluster autoscaler).

In some embodiments of the invention, the adding of one or more of the resumed nodes comprises tagging one or more of the resumed nodes, the tagging to match a cluster autoscaler.

In some embodiments, in order to optimize instance types after resources are added to the cluster (e.g., after the cluster is going through a disruption such that resources need to be added to or changed quickly), the system may tag relevant nodes and for example offload or transfer tasks of adding additional or alternative nodes to the cluster, and/or of replacing the current nodes with optimal instance types to the upstream manager for the node group it protects. Nonlimiting examples of existing cluster autoscalers which may be integrated with some embodiments of the invention are: the Cluster-Autoscaler, the Karpenter, and the Spot Ocean autoscalers used within the Kubernetes environment. Additional or alternative components which may be combined or integrated with different embodiments of the invention may be realized. In some embodiments, adoption (which may include or may follow the adding of nodes or of resumed nodes to the cluster) may be achieved, e.g., according to the following nonlimiting example use cases:

- Embodiments may add a Cluster-Autoscaler-specific tag to the VM of the relevant node or QNode to match Cluster-Autoscaler, and Cluster-Autoscaler may then consider a QNode and/or relevant underlying instances or resources as "its own", or may manage the node or resources accordingly. In some embodiments, tagging may be or may include, e.g., adding, updating, or changing a CRD or database entry describing a state or states of nodes or QNodes such as for example described herein (e.g., " . . . /cluster-autoscaler/=0", and the like). This may include adding the VM to, e.g., auto scaling groups managed by Cluster-Autoscaler. Once Cluster-Autoscaler considers the underlying VM of QNode as if it was one of the nodes under its supervision or management, or otherwise among the nodes it created, it may downscale/replace it with alternative resources accordingly.
- Karpenter-specific tags may be added to the relevant VM to match the Karpenter autoscaler, which may be performed, for example, by a Karpenter-specific object or node-associated object (and which may for example be implemented in a dedicated Kubernetes custom resource definition or CRD) which may represent or reference the instance, node, or QNode (an example label may be, e.g., in the form of "karpenter.sh/*provisioner-name*").
- Spot Ocean "migrations" endpoint may be used for instructing the Spot Ocean autoscaler to replace relevant nodes with some of its own nodes (e.g., if they are found to be associated with instance zones and type more optimal for a given pod or cluster). In some embodiments, resource or instance identifiers (or "instanceIds") may be included or used in requests by a Spot Ocean API, and may specify the instances that should be migrated. This API may instruct Spot Ocean to create its own node that will replace the original nodes and to "drain" and delete the original nodes.

Some embodiments of the invention may include or provide a "rolling node migration" adoption mechanism—which may, e.g., following the protection of a cluster from interruptions and/or spikes of usage or demand using the various methods and protocols described herein, replace suboptimal computational resources or instances with optimal ones. In some embodiments, a parameter called <DrainPercentage> may be defined. At each moment in time a <DrainPercentage> of nodes among all nodes in the system or cluster (e.g., not just QNodes) may be "drained" or deleted in a nodepool or set of nodes defined and/or included in and/or supervised by a relevant software object (such as for example a QScaler, QBaker, and the like) and/or for an entire cluster—e.g., according to the protocols and procedures discussed herein, to ensure robust, safe, and error free migration from, and/or shutdown of, relevant nodes—until there are no more QNodes left.

By limiting the drain concurrency to <DrainPercentage>, embodiments may ensure that at no point in time there may be a significant lack of resources in the cluster. Node draining may be performed using a mechanism referred to herein as "Safe Drain", which reserves capacity for all pods on the node before evicting them. This may prove useful, for example, since "draining" or migrating nodes may reduce the computational capacity of the relevant cluster for the time period or duration of the draining or migration process, and therefore draining or migrating a plurality of nodes in multiple parts or segments (e.g., as opposed to doing so at once) may further protect the cluster from undesirable failures.

For example, in some embodiments, a rolling node migration procedure may include or involve, for pods associated with one or more computer tasks, or for nodes associated with one or more pods, mapping the pods or node (which may for example be hibernated nodes) to a shadow representation of the pod or node (also referred to as a "shadow pod" in nonlimiting examples herein) where the shadow representation includes a plurality of resource selection parameters—and then replacing the shadow representation with "real", or with regular pods or nodes that may be used to execute or perform the relevant tasks.

In this context, nodes resumed and/or added to a running computer cluster by some embodiments of the invention (such as for example according to the protocols and procedures discussed herein) may include e.g., mapped nodes, nodes mapped to the shadow pod, or nodes on which using the shadow pod may be scheduled or executed—such as for example nodes found as replacement to the nodes responsible for executing the original, shadowed pod. The adding of the resumed nodes may thus include or involve, or may be followed by, evicting a plurality of computer resources from the running computer cluster (where evicted resources may be associated with the relevant shadowed pod), and deleting the shadow representation of the pod—such as for example demonstrated herein. In some embodiments, a node or VM may not be deleted or discarded until all of the pods that run on it are complete or deleted, and upon deleting a pod that is part of a workload (and that, e.g., has not been completed), a new pod may be created to replace it (which may, e.g., provide desirable safety features and prevent node-associated failures or vulnerabilities). "Shadow pods" may thus be a mechanism that may be used to guarantee available capacity for these replacement pods.

Some embodiments of the invention may include, for a pod associated with one or more computer tasks: mapping one or more of the hibernated nodes to a shadow representation of the pod, the shadow representation comprising one or more resource selection parameters. In some embodiments, the one or more resumed nodes includes one or more of the mapped nodes. In some embodiments, the adding of one or more of the resumed nodes comprises evicting one or more computer resources from the running computer cluster, the evicted resources associated with the pod, and deleting the shadow representation of the pod.

For example, a nonlimiting migration process and/or Safe Drain procedure according to some embodiments may include or involve:

For each pod (such as for example a pod which may not be completed due to interruptions on a given node), embodiments may create a shadow/ballast pod that may not correspond or specify a computerized task for execution, and may, e.g., be used for reserving CPU/memory or any computational resources equal to those requested or used by the original (e.g. "shadowed") pod in relevant zones/instance-types, or for pods that have not yet been created and/or executed. This may be achieved, for example, by copying or transferring data or contents from the shadowed pod into the shadow pod—which may include the various parameters such as for example: resource requests specified by or included in the pod (see, e.g., discussion herein), as well as additional or alternative parameters as, e.g., resource selection parameters (specifying, e.g., zones and/or types) and/or additional parameters known or used in the nonlimiting example of a Kubernetes environment such as for example a node/pod affinity/selector; topologySpreadConstraints; and the like.

Instead of using the shadowed pod's image and startup command, the shadow pod may have the pause image and may use "sleep" as its runtime command. In addition, the shadow pod may include or use a low PriorityClass (which may, in some embodiments, determine how urgently or quickly a given pod may be assigned or be linked with a node and be executed), e.g., for making sure it does not take the place of real pods and/or interrupt their running or execution.

When the shadow representation or ballast pod gets scheduled and starts running—and is for example mapped, assigned or scheduled, for example to hibernated nodes which may be resumed by some embodiments of the invention (or in other words, after one or more hibernated nodes are mapped to the shadow pod, such that the nodes may be resumed and may execute tasks specified by the shadow pod)—embodiments may evict or replace the original or shadowed pod and/or migrate the pods contents and jobs into resources reserved by the shadow or ballast pod. In some embodiments, shadow or ballast pods may be labeled or linked to a shadowed pod such that a relationship or mapping exists between the shadow pod and the shadowed pod. For example, a label referencing a ballast or shadow pod, e.g., "q.ai/ballast-podID" may include an identifier of the shadow pod and be placed in or added to the CRD of the shadowed pod, while a label "q.ai/original-podID" may be placed in or added to the CRD of the ballast pod. In such manner, for example, some embodiments may relate a pod and its shadow representations, e.g., such that once a shadow pod is scheduled, some embodiments may migrate the shadowed pod to resources reserved by the shadow pod; additional or alternative migration procedures may be included in different embodiments.

Once a replacement for the original, shadowed pod is running (e.g., once the original pod is running on resources reserved by the shadow or ballast pod—e.g., once hibernated nodes assigned or mapped to the shadow pod are resumed and then used as replacement nodes for running the original, shadowed pod which have been migrated into the resumed nodes), embodiments may delete the shadow or ballast pod.

Once all pods for a relevant node are deleted, some embodiments may subsequently delete or evict the relevant node and corresponding computer resources associated with or used for running or executing the shadowed pod, and the process may terminate.

Additional or alternative adoption mechanisms, including different autoscaling related operations may be included in different embodiments of the invention.

Figure 3:
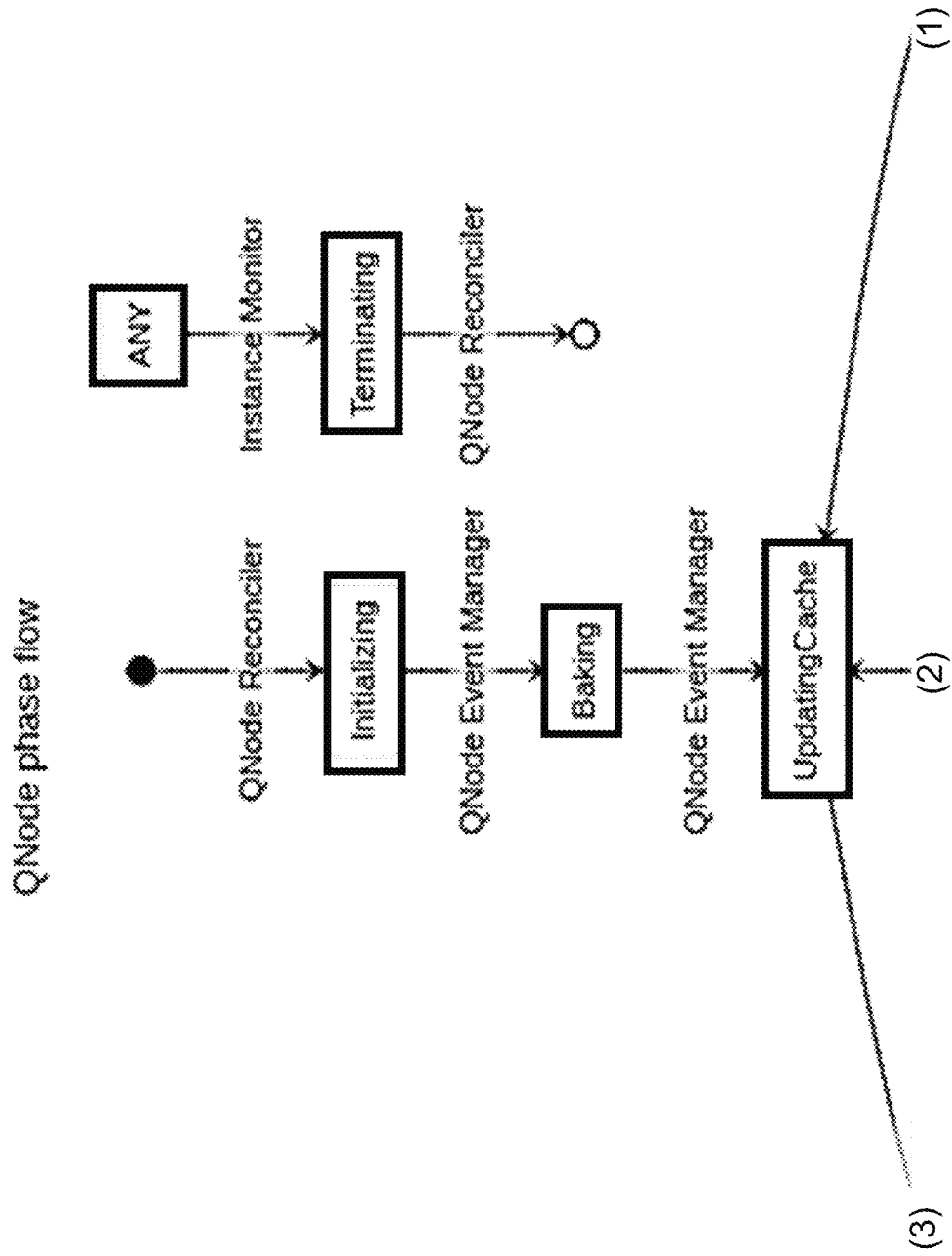
FIG. 3 illustrates an example workflow for hibernating and resuming computerized nodes according to some embodiments of the invention.
Figure 3:
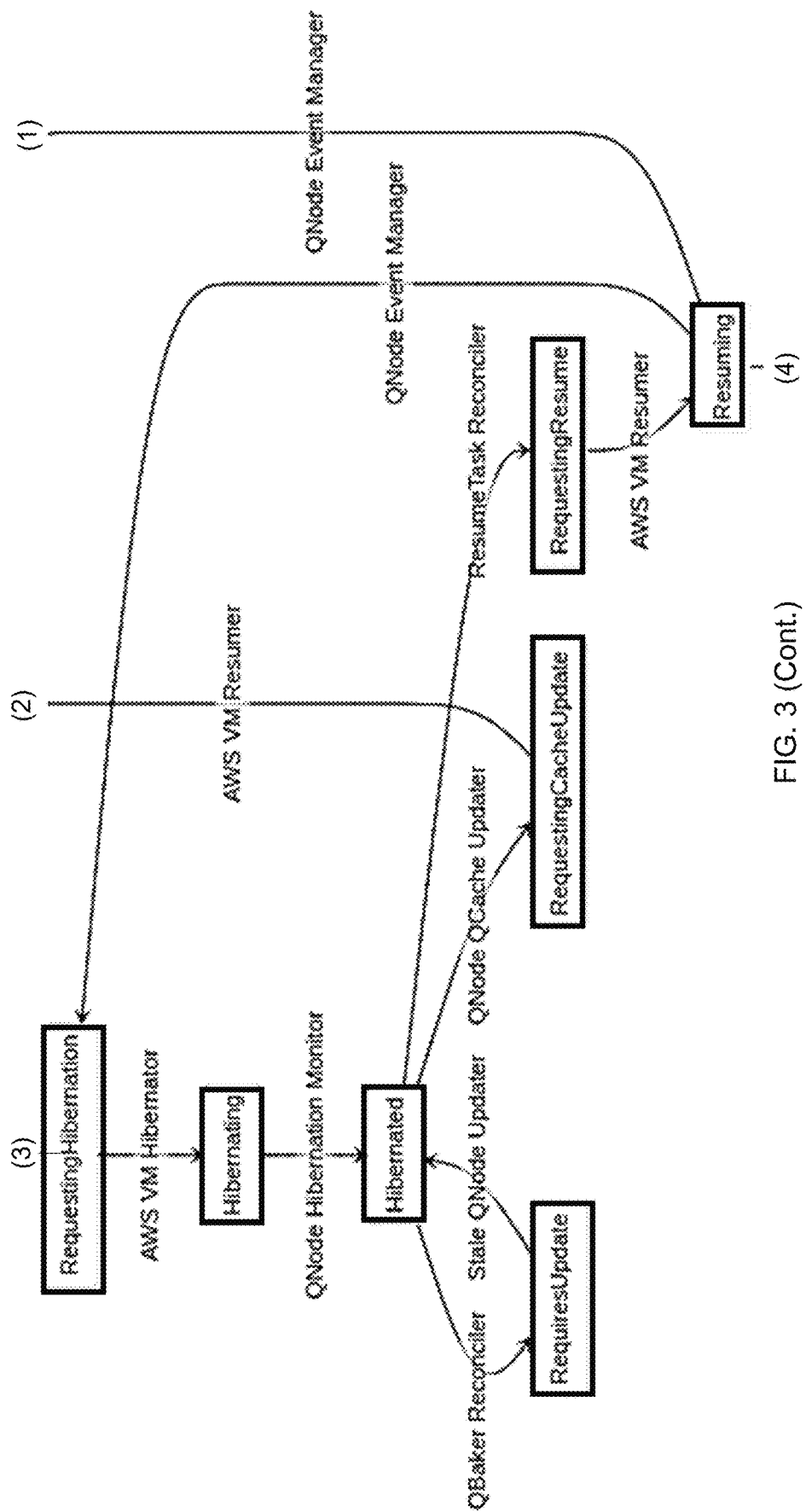
Figure 3:
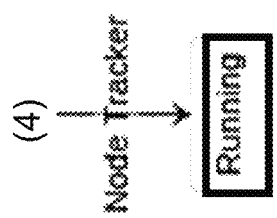

FIG. 3 illustrates an example workflow for hibernating and resuming computerized nodes according to some embodiments of the invention. Some embodiments may include a plurality of phases or states for objects or entities such as, e.g., QNodes, which may include, e.g., an "initilizing" phase where a VM may be created for a given QNode, for example using an API for the cloud provider or cluster operator (which may include or involve a node reconciler). During a "Baking" phase, the VM may boot and run a startup script which may include, e.g., starting or initiating a QNode agent or objects representing the VM such as described herein. The QNode agent may then configure and/or update settings or configurations of the VM, and may send a message to a QNode event manager or controller object which may notify the event manager or controller that the VM is ready for use. The QNode event manager or controlled may then change the node or QNodes's state or phase to "RequestingHibernation". A hibernating object and/or procedure (which may, e.g., be executed by a Kubernetes or AWS object, entity or custom resource) may monitor or look up (e.g., periodically, for example every 2 minutes) VMs in the "RequestingHibernation" phase and may send batched requests to a cloud provider API to hibernate the relevant VMs or corresponding nodes or QNodes (in some embodiments, batched requests may be sent once in predetermined time intervals, such as for example every 10 minutes). Once nodes or QNodes are hibernated, the relevant object may change their states or phases to "Hibernating". A ResumeTask may pick or select a "Hibernated" QNode and its corresponding VM for resumption, and may trigger the resumption by changing the QNode phase to "RequestingResume". A VM resumed object which may be for example one or more of the objects or entities, e.g., within the Kubernetes and/or AWS environment, may monitor "RequestingResume" VMs or nodes/QNodes and may send batched resume requests to the cloud provider API which may accordingly change their phase to "Resuming" (in some embodiments, the monitoring and sending of batched request may be performed in a manner similar to that done for VMs requesting hibernation, although alternative procedures may be used in different embodiments). A node tracker object or entity (which may be, among the entities described herein) may monitor, e.g., the Kubernetes API and when it detects that a node object or machine was booted, it may update the state phase of the corresponding QNode to "Running". See also nonlimiting code examples herein; additional or alternative states or phases, and processes or procedure for changing these states or phases, may be included in different embodiments.

Some embodiments may include performing at least one computer task using one or more of the added nodes.

Some embodiments of the invention may include performing a computer task, or a plurality of computer tasks using the nodes added to the cluster according to the protocols and procedures outlined herein. For example, in the nonlimiting cases where nodes are added to a computerized cluster in response to a pod marked unschedulable, or in response to a shutdown notice (e.g., a spot interruption)—embodiments of the invention may include scheduling the relevant pod to a newly added node or nodes, such that the pod may be executed by a node associated with a resource or instance suitable for its execution and matching relevant resource specifications such as for example described herein. Additional or alternative examples or use cases of performing computer tasks using nodes created or added by different embodiments of the invention may be realized.

Figure 4:
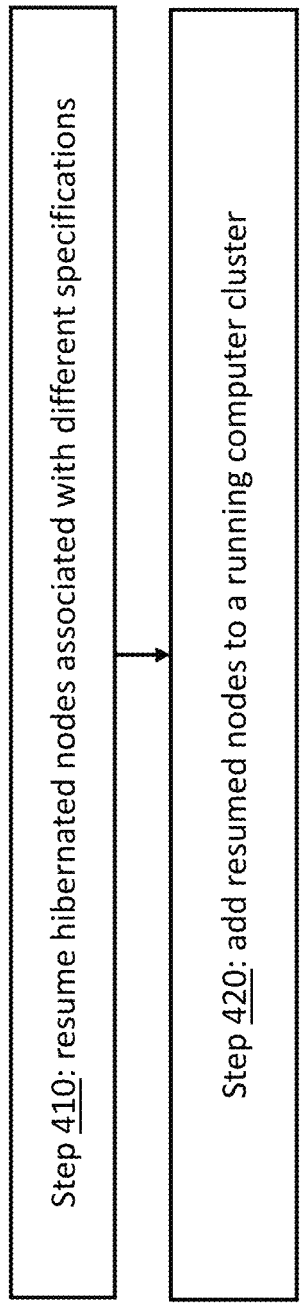
FIG. 4 shows an example method for allocating computer resources according to some embodiments of the invention.

FIG. 4 shows an example method for allocating computer resources according to some embodiments of the invention. In step 410, embodiments may resume a plurality of hibernated nodes, where at least two of the hibernated nodes differ by at least one resource specification (such as for example an instance or resource zone or type), or are associated with at least two different specifications (such as, e.g., two different instance zones and/or instance types). Embodiments may then add one or more of the resumed nodes (such as for example the n first nodes to be resumed) to a running computer cluster (step 420).

Tables 1-12 show nonlimiting code examples for entities or CRDs according to some embodiments of the invention.

TABLE 1

```
QNODE
    package v1alpha1
    import (
        "fmt"
        corev1 "k8s.io/api/core/v1"
        metav1 "k8s.io/apimachinery/pkg/apis/meta/v1"
    )
    // QNodeSpec defines the desired state of QNode
    type QNodeSpec struct {
        // The instance type in the corresponding cloud provider
        InstanceType string `json:"instanceType,omitempty"`
        // The node labels to be applied to the node
        Labels map[string]LimitedLengthString `json:"labels,omitempty"`
        // The node taints to be applied to the node
        Taints [ ]corev1.Taint `json:"taints,omitempty"`
        // The target to which QNodes should be added
        Target Target `json:"target"`
        // The AWS specific configuration for the node
        Aws AwsQNodeConfig `json:"aws,omitempty"`
    }
    // AwsQNodeConfig defines AWS specific configuration for a QNode
    type AwsQNodeConfig struct {
        // The AWS AMI ID to be used for the underlying VM
        ImageID string `json:"imageId,omitempty"`
        // The AWS security groups to be applied to the underlying VM
        SecurityGroupIds [ ]string `json:"securityGroupIds,omitempty"`
        // The availability zone to be applied to the underlying VM
        AvailabilityZone string `json:"availabilityZone,omitempty"`
        // The AWS subnet ID to be applied to the underlying VM
        SubnetId string `json:"subnetId,omitempty"`
```

TABLE 1-continued

```
    // The AWS device mapping to be applied to the underlying VM
    DeviceMapping map[string]*DeviceMappingEntry `json:"deviceMapping,omitempty"`
    // The AWS root volume name to be applied to the underlying VM
    RootVolumeName string `json:"rootVolumeName,omitempty"`
    // Instance profile arn
    InstanceProfileArn string `json:"instanceProfileArn,omitempty"`
    // Imds Version
    Imds Version *string `json:"imdsVersion,omitempty"`
    // Imds Max Hop Count
    ImdsMaxHopCount *int32 `json:"imdsMaxHopCount,omitempty"`
}
```

TABLE 2

```
func (a AwsQNodeConfig) RootVolumeSizeGB( ) (int32, error) {
    for _, deviceMappingEntry := range a.DeviceMapping {
        if deviceMappingEntry.DeviceName == nil {
            return 0, fmt.Errorf("device name is nil")
        }
        if deviceMappingEntry.SizeGB == nil {
            return 0, fmt.Errorf("size is nil")
        }
        if *deviceMappingEntry.DeviceName == a.RootVolumeName {
            return *deviceMappingEntry.SizeGB, nil
        }
    }
    return 0, fmt.Errorf("root volume name %s not found in device mapping",
a.RootVolumeName)
}
//
+kubebuilder:validation:Enum=Initializing;Baking;RequestingHibernation;Hibernating;Hibernated;
RequestingResume;Resuming;Running;RequiresUpdate;UpdatingCache; Terminating
    type QNodePhase string
    var (
        QNodeInitializingPhase            QNodePhase = "Initializing"
        QNodeBakingPhase                  QNodePhase = "Baking"
        QNodeRequestingHibernationPhase   QNodePhase = "RequestingHibernation"
        QNodeHibernatingPhase             QNodePhase = "Hibernating"
        QNodeHibernatedPhase              QNodePhase = "Hibernated"
        QNodeRequestingResumePhase        QNodePhase = "RequestingResume"
        QNodeResumingPhase                QNodePhase = "Resuming"
        QNodeRunningPhase                 QNodePhase = "Running"
        QNodeRequires UpdatePhase         QNodePhase = "RequiresUpdate"
        QNodeUpdatingCachePhase           QNodePhase = "UpdatingCache"
        QNodeTerminatingPhase             QNodePhase = "Terminating"
    )
    func (q QNodePhase) Equals(other *QNodePhase) bool {
        if other == nil {
            return false
        }
        return q == *other
    }
    type QNodeAWSStatus struct {
        // Whether or not the QNode got already attached to a target
        TargetAttached bool `json:"targetAttached,omitempty"`
}
```

TABLE 3

```
// QNodeStatus defines the observed state of QNode
type QNodeStatus struct {
    // The current phase of the QNode
    // +kubebuilder:default:=Initializing
    Phase *QNodePhase `json:"phase,omitempty"`
    // The id of the underlying VM in the cloud provider
    InfraId string `json:"infraId,omitempty"`
    // The AWS specific status for the node
    Aws QNodeAWSStatus `json:"aws,omitempty"`
    // The time at which the QNode scale in protection started
    ScaleInProtectionStartTime string`json:"scaleInProtectionStartTime,omitempty"`
    // The time at which the QNode scale in protection will end
    ScaleInProtectionEndTime string `json:"scaleInProtectionEndTime,omitempty"`
    // QCache status
    QCacheStatus QNodeQCacheStatus `json:"qCacheStatus,omitempty"`
    // Resume interruption id
```

TABLE 3-continued

```
    ResumeInterruptionID string `json:"resumeInterruptionID,omitempty"`
    // Resume reason for the QNode
    ResumeReason ResumeReason `json:"resumeReason,omitempty"`
    // The time at which the QNode started resuming
    StartedResumingAt metav1.Time `json:"startedResumingAt,omitempty"`
    // The time at which the QNode finished resuming
    FinishedResumingAt metav1.Time `json:"finishedResumingAt,omitempty"`
    // Always Yes for Karpenter and Spot.IO instances. Yes for CAS, when rebalancing happens
    Drainable bool `json:"drainable,omitempty"`
    // The time at which the QNode started draining
    DrainStartTime metav1.Time `json:"drainStartTime,omitempty"`
}
```

TABLE 4

```
type QNodeQCacheStatus struct {
    // The type of the shard
    ShardType QCacheShardType `json:"shardType,omitempty"`
    // The shard index
    ShardIndex int `json:"shardIndex"`
    // The version of the qcache revision
    Revision Version uint32 `json:"revision Version"`
    // The shard that this volume contains the data for
    ShardName string `json:"shardName"`
    // The shard generational identifier
    GenerationIdentifier string `json:"generation"`
    // Count of images the qnode lags behind the shard
    LaggingImageCount int `json:"laggingImageCount"`
    // Unix epoch int64 timestamp of the last time the shard was updated
    LastUpdatedAt metav1.Time `json:"lastUpdatedAt,omitempty"`
}
// +genclient
// +genclient:nonNamespaced
// +kubebuilder:printcolumn:name="Phase",type="string",JSONPath=".status.phase"
//
+kubebuilder:printcolumn:name="Cache_lag",type="integer",JSONPath=".status.qCacheStatus.1agginglmageCount"
//
+kubebuilder:printcolumn:name="Instance_Type",type="string",JSONPath=".spec.instanceType"
//
+kubebuilder:printcolumn:name="Zone",type="string",JSONPath=".spec.aws.availabilityZone"
    // +kubebuilder:printcolumn:name="Infra_Id",type="string",JSONPath=".status.infraId"
    //
  +kubebuilder:printcolumn:name="Age",type="date",JSONPath=".metadata.creationTimestamp"
    //
  +kubebuilder:printcolumn:name="Started",type="date",JSONPath=".status.finishedResumingAt"
    //+kubebuilder:object:root-true
    //+kubebuilder:subresource:status
    //+kubebuilder:resource:scope-Cluster
```

TABLE 5

```
    // QNode represents a Qubex node through all it's lifecycle, from baking to hibernation until joining the cluster
    type QNode struct {
        metav1.TypeMeta `json:",inline"`
        metav1.ObjectMeta `json:"metadata,omitempty"`
        Spec QNodeSpec `json:"spec,omitempty"`
        Status QNodeStatus `json:"status,omitempty"`
    }
    //+kubebuilder:object:root=true
    // QNodeList contains a list of QNode
    type QNodeList struct {
        metav1.TypeMeta `json:",inline"`
        metav1.ListMeta `json:"metadata,omitempty"`
        Items [ ]QNode `json:"items"`
    }
    func init( ) {
        SchemeBuilder.Register(&QNode{ }, &QNodeList{ })
    }
    apiVersion:qscaler.qubex.ai/v1alpha1
    kind:QNode
    metadata:
    creation Timestamp:"2024-05-01T15:25:02Z"
    finalizers:
    - qnode.qubex.ai/finalizer
    generation:1
    labels:
        qubex.ai/qbaker-uid:48deec41-d514-4248-8963-309973848f97
        qubex.ai/qscaler-uid:9f5d21c3-967c-421a-bb70-d87f518001d5
    name:eksctl-isaac-33azcha0ge-09e66148
    ownerReferences:
    - apiVersion:qscaler.qubex.ai/v1alpha1
      blockOwnerDeletion:true
      controller:true
      kind:QBaker
      name:eksctl-isaac-33azcha0ge
      uid:48deec41-d514-4248-8963-309973848f97
    resource Version:"744322"
    uid:e5fa6af6-5132-4002-a54e-82bac0bd93c8
```

TABLE 6

```
spec:
  aws:
    availabilityZone:eu-central-1c
    deviceMapping:
      /dev/xvda:
        deviceName:/dev/xvda
        sizeGB:20
        type:gp3
    imageId:ami-0b1fe9f78ee0e8142
    imdsMaxHopCount:2
    imds Version:required
    instanceProfileArn:arn:aws:iam::522092145756:instance-profile/eksctl-eksctl-isaac-nodegroup-ng-1-NodeInstanceProfile-j1mQbcpPrvsu
    rootVolumeName:/dev/xvda
    securityGroupIds:
      - sg-08dd659f083f7e410
      - sg-0346f942f7b285070
    subnetId:subnet-009fc16ac6685a9a3
  instanceType:c7a.xlarge
  labels:
    alpha.eksctl.io/cluster-name:eksctl-isaac
    alpha.eksctl.io/nodegroup-name:ng-1
    beta.kubernetes.io/arch:amd64
    beta.kubernetes.io/os:linux
    eks.amazonaws.com/capacityType:ON_DEMAND
    failure-domain.beta.kubernetes.io/region:eu-central-1
```

TABLE 6-continued

```
    kubernetes.io/arch:amd64
    kubernetes.io/os:linux
    node-lifecycle:on-demand
    qubex.ai/qscaler-node:"true"
    topology.kubernetes.io/region:eu-central-1
  target:
    clusterAutoscalerTarget:
      asgName:eksctl-eksctl-isaac-nodegroup-ng-1-NodeGroup-GvMb3wM25Fmk
      nodegroupName:ng-1
      type:ClusterAutoscalerASG
      upstreamCloudName:eksctl-eksctl-isaac-nodegroup-ng-1-nodegroup-gvmb3wm25fmk
status:
  aws:{ }
  infraId:i-098093e81aa35ded5
  phase:Hibernated
  qCacheStatus:
    generation:e434c4e2-b6b7-419f-8ca3-1944415bc76e
    laggingImageCount:0
    lastUpdatedAt:"2024-05-01T15:28:35Z"
    revision Version:0
    shardIndex:0
    shardName:revision-0-0
    shardType:AWS
```

TABLE 7

```
QBAKER
    package v1alpha1
    import (
        "golang.org/x/exp/maps"
        corev1 "k8s.io/api/core/v1"
        metav1 "k8s.io/apimachinery/pkg/apis/meta/v1"
    )
    type QBakerInstanceType struct {
        // The instance type in the corresponding cloud provider
        InstanceType string `json:"instanceType"`
        // The desired number of hibernated QNodes the baker should ensure
        MaxHibernatedQNodes int `json:"maxHibernatedQNodes"`
    }
    type QBakerSpec struct {
        Instance Types [ ]QBakerInstanceType `json:"instancetypes"`
        // The node labels to be applied to the node
        Labels map[string]LimitedLengthString `json:"labels,omitempty"`
        // The node taints to be applied to the node
        Taints [ ]corev1. Taint `json:"taints,omitempty"`
        // The target to which QNodes should be added
        Target Target `json:"target"`
        // The AWS specific configuration for the node
        Aws AwsQBakerConfig `json:"aws,omitempty"`
        // QCache hash
        // +kubebuilder:default:=0
        QCacheEpoch uint64 `json:"qCacheEpoch,omitempty"`
    }
    func (q *QBakerSpec) CleanValues( ) {
        if q.InstanceTypes != nil && len(q.InstanceTypes) == 0 {
            q.InstanceTypes = nil
        }
        if q.Labels != nil && len(q.Labels) == 0 {
            q.Labels = nil
        }
        if q.Taints != nil && len(q.Taints) == 0 {
            q.Taints = nil
        }
    }
```

TABLE 8

```
// AwsQBakerConfig defines AWS specific configuration for a node
type AwsQBakerConfig struct
    // The AWS AMI ID to be used for the underlying VM
    ImageID string `json:"imageId,omitempty"`
    // The security groups to be applied to the underlying VM
    SecurityGroupIds [ ]string `json:"securityGroupIds,omitempty"`
    // A map containing zone specific details for all zones covered by the QScaler
```

TABLE 8-continued

```
      ZoneDetails map[string]ZoneDetails `json:"zoneDetails,omitempty"`
      // The AWS device mapping to be applied to the underlying VM
      DeviceMapping map[string]*DeviceMappingEntry`json:"deviceMapping,omitempty"`
      // The AWS root volume name to be applied to the underlying VM
      RootVolumeName string `json:"rootVolumeName,omitempty"`
      // Instance profile arn
      InstanceProfileArn string `json:"instanceProfileArn,omitempty"`
      // Imds version
      ImdsVersion *string `json:"imdsVersion,omitempty"`
      // Imds max hop count
      ImdsMaxHopCount *int32 `json:"imdsMaxHopCount,omitempty"`
   }
   func (a *AwsQBakerConfig) AvailabilityZones( ) [ ]string {
      return maps.Keys(a.ZoneDetails)
   }
   func (a * AwsQBakerConfig) Subnets( ) [ ]string {
      var subnets [ ]string
      for _, zoneDetails := rangea.ZoneDetails {
         subnets = append(subnets, zoneDetails.SubnetIds...)
      }
      return subnets
   }
   type SharedResumeQueuesInfo struct {
      // The URL of the SQS queue from which the QNode will receive messages about
resume/abort
      QueueUrl string `json:"queueUrl"`
      // the related shard identifier
      ShardId string `json:"shardId"`
   }
```

TABLE 9

```
   type QBakerStatus struct {
      // The current number of hibernated QNodes
      CurrentCapacity int `json:"currentCapacity,omitempty"`
      // internal usage - the sqs queue from which the QNode will receive messages about
resume/abort
      ShardResumeQueues            [ ]SharedResumeQueuesInfo
`json:"resumeQueueUrls,omitempty"`
   }
   // +genclient
   // +genclient:nonNamespaced
   //
+kubebuilder:printcolumn:name="Current_Capacity",type="integer",JSONPath=".status.current
Capacity"
   //
+kubebuilder:printcolumn:name="Age",type="date",JSONPath=".metadata.creationTimestamp"
   // +kubebuilder:object:root-true
   // +kubebuilder:subresource:status
   // +kubebuilder:resource:scope-Cluster
   // QBaker is the entity responsible for ensuring that there is always a suffiently large pool
of hibernated QNodes.
   type QBaker struct {
      metav1.TypeMeta `json:",inline"
      metav1.ObjectMeta `json:"metadata,omitempty""
      Spec QBakerSpec `json:"spec,omitempty"`
      Status QBakerStatus `json:"status,omitempty"`
   }
   func (q *QBaker) GetDesiredCapacity( ) int {
      desiredCapacity := 0
      for _, instanceType := range q.Spec.InstanceTypes {
         desiredCapacity += instanceType.MaxHibernatedQNodes
      }
      return desiredCapacity
   }
   // +kubebuilder:object:root=true
   type QBakerList struct {
      metav1.TypeMeta `json:",inline"`
      metav1.ListMeta `json:"metadata,omitempty"`
      Items         [ ]QBaker`json:"items"`
   }
   func init( ) {
      SchemeBuilder. Register(&QBaker{ }, &QBakerList{ })
   }
```

TABLE 10

```
apiVersion:qscaler.qubex.ai/v1alpha1
    kind:QBaker
    metadata:
    creation Timestamp:"2024-05-01T08:44:04Z"
    finalizers:
    - qbaker. qubex. ai/finalizer
    generation:2
    labels:
        qubex.ai/qscaler-uid:9f5d21c3-967c-421a-bb70-d87f518001d5
    name:eksctl-isaac-33azcha0ge
    ownerReferences:
    - apiVersion:qscaler.qubex.ai/v1alpha1
        blockOwnerDeletion:true
        controller:true
        kind:QScaler
        name:eksctl-eksctl-isaac-nodegroup-ng-1-nodegroup-gvmb3wm25fmk
        uid:9f5d21c3-967c-421a-bb70-d87f518001d5
    resource Version:"741346"
    uid:48deec41-d514-4248-8963-309973848f97
  spec:
    aws:
      deviceMapping:
        /dev/xvda:
          deviceName:/dev/xvda
          sizeGB:20
          type:gp3
      imageId:ami-0b1fe9f78ee0e8142
      imdsMaxHopCount:2
      imdsVersion:required
      instanceProfileArn:arn:aws:iam::522092145756:instance-profile/
eksctl-eksctl-isaac-nodegroup-ng-1-NodeInstanceProfile-j1mQbcpPrvsu
      rootVolumeName:/dev/xvda
      securityGroupIds:
      - sg-08dd659f083f7e410
      - sg-0346f942f7b285070
```

TABLE 11

```
zoneDetails:
        eu-central-1b:
          subnetIds:
          - subnet-056cf6a2fe60bc52c
        eu-central-1c:
          subnetIds:
          - subnet-009fc16ac6685a9a3
    instancetypes:
    - instanceType: m7i.large
        maxHibernatedQNodes: 4
    - instanceType: c7a.xlarge
        maxHibernatedQNodes: 3
    - instanceType: c7i.xlarge
        maxHibernatedQNodes: 3
    labels:
        alpha.eksctl.io/cluster-name: eksctl-isaac
        alpha.eksctl.io/nodegroup-name: ng-1
        beta.kubernetes.io/arch: amd64
        beta.kubernetes.io/os: linux
        eks.amazonaws.com/capacityType: ON_DEMAND
        failure-domain.beta.kubernetes.io/region: eu-central-1
        kubernetes.io/arch: amd64
        kubernetes.io/os: linux
        node-lifecycle: on-demand
        qubex.ai/qscaler-node: "true"
        topology.kubernetes.io/region: eu-central-1
    qCacheEpoch: 0
    target:
        cluster Autoscaler Target:
          asgName: eksctl-eksctl-isaac-nodegroup-ng-1-NodeGroup-GvMb3wM25Fmk
          nodegroupName: ng-1
          type: ClusterAutoscalerASG
          upstreamCloudName: eksctl-eksctl-isaac-nodegroup-ng-1-nodegroup-gvmb3wm25fmk
    status:
      currentCapacity: 10
      resumeQueueUrls:
      - queueUrl: https://sqs.eu-central-1.amazonaws.com/522092145756/QScaler-resume-
events-48deec41-d514-4248-8963-309973848f97-01fbab5cb2c022ff
          shardId: 00000000-0000-0000-0000-000000000000
```

TABLE 11-continued

```
  - queueUrl: https://sqs.eu-central-1.amazonaws.com/522092145756/QScaler-resume-
events-48deec41-d514-4248-8963-309973848f97-9f89057449941764
        shardId: revision-0-0
```

TABLE 12

```
QSCALER
    package v1alpha1
    import (
        corev1 "k8s.io/api/core/v1"
        metav1 "k8s.io/apimachinery/pkg/apis/meta/v1"
    )
// +kubebuilder:validation:Enum=AWS
type InfraParamsType string
const (
    AWSInfraParamsType InfraParamsType = "AWS"
)
// +kubebuilder:validation:Enum=Unschedulable
type QScalerScalingPolicyType string
const (
    UnschedulableScalingPolicy QScalerScalingPolicyType = "Unschedulable"
)
type InfraParams struct {
    // the infra params type - only AWS is supported for now
    Type InfraParamsType 'json:"type"'
    // the infra params for AWS
    AWS *InfraParamsAWS 'json:"aws,omitempty"'
// NodeParams represents scaler target, before adjusting any overrides
type NodeParams struct {
    // labels associated with this target
    Labels map[string]LimitedLengthString 'json:"labels,omitempty"'
    // The node taints associated with this target
    Taints [ ]corev1.Taint 'json:"taints,omitempty"'
    // The node startup taints associated with this target
    StartupTaints [ ]corev1.Taint 'json:"startupTaints,omitempty"'
    // The node annotations associated with this target
    Annotations map[string]string'json: "annotations, omitempty"''
    // The maximum capacity associated with this target
    MaxCapacity int 'json:"maxCapacity,omitempty"'
}
```

TABLE 13

```
func (n *NodeParams) Clean Values( ) {
    if n.Labels != nil && len(n.Labels) == 0 {
        n.Labels = nil
    }
    if n.Taints != nil && len(n.Taints) == 0 {
        n.Taints = nil
    }
    if n.StartupTaints != nil && len(n.StartupTaints) == 0 {
        n.StartupTaints = nil
    }
    if n.Annotations != nil && len(n.Annotations) == 0 {
        n.Annotations = nil
    }
}
// +kubebuilder:validation:Enum=MachineCount
type UnschedulableScaleThresholdType string
const (
    UnschedulableScaleThresholdMachineCount UnschedulableScaleThresholdType =
"MachineCount"
)
type UnschedulableScaleThreshold struct {
    // The type of the threshold
    Type UnschedulableScaleThresholdType 'json:"type"'
    // The value of the threshold
    Value int 'json:"value"'
}
type UnschedulableScalingPolicyParams struct {
    // The threshold for the number of unschedulable nodes
    UnschedulableScaleThreshold                *UnschedulableScaleThreshold
'json:"unschedulableScaleThreshold,omitempty"'
    // The affinity rules for which unschedulable pods should be considered in the calculation
    Affinity *QScalerAffinity 'json:"affinity,omitempty"'
```

TABLE 13-continued

```
}
type QScalerPodAffinity struct {
    // The label selector for the pods
    LabelSelector *metav1.LabelSelector 'json:"labelSelector,omitempty"'
}
```

TABLE 14

```
type QScalerAffinity struct
    // The criteria for the pods must implement
    PodAffinity QScalerPodAffinity 'json:"podAffinity,omitempty"'
    // The criteria for the pods must not implement
    PodAntiAffinity QScalerPodAffinity 'json:"podAntiAffinity,omitempty"'
}
type QScalerUnschedulablePodScalingPolicy struct {
    // The state of the scaling policy
    Active bool 'json:"active"'
    // The type of the scaling policy
    Type QScalerScalingPolicyType 'json:"type"'
    // The parameters for the scaling policy if it's of type Unschedulable
    UnschedulableScaleThreshold              *UnschedulableScaleThreshold
'json:"unschedulableScalingPolicy omitempty"'
}
type QScalerSpotFailureProtectionPolicy struct {
    // The state of the policy
    Active bool 'json:"active"'
}
type QBakerReference struct {
    // The name of the baker
    Name string 'json:"name"'
}
type QBakerTemplate struct {
    // The spec of the baker
    Spec QBakerSpec 'json:"spec"'
}
type SourceQBaker struct {
    // A reference to an existing baker
    Reference *QBakerReference 'json:"reference,omitempty"'
    // A template for generating a baker that will be used by the scaler
    Template *QBakerTemplate 'json:"template,omitempty"'
}
```

TABLE 15

```
type QScalerSpec struct
    // The maximum number of QNodes that the scaler can resume
    MaxRunningQNodes int 'json:"maxRunningQNodes"'
    // The object that the scaler is in charge of scaling, currently only ASG and Karpenter are
supported
    Target Target 'json:"target"'
    // The pod scaling policy to be applied to the target
    PodScalingPolicy QScalerUnschedulablePodScalingPolicy 'json:"scalingPolicy"'
    // The spot failure protection policy to be applied to the target
    SpotFailureProtectionPolicy              QScalerSpotFailureProtectionPolicy
'json: "spotFailureProtectionPolicy"'
    // The baker that will be used to take hibernated QNodes from.
    // Can be either a reference to an existing baker or a template for generating a baker.
    Source SourceQBaker 'json:"source"'
}
type QScalerStatus struct {
    // The active node parameters
    NodeParams *NodeParams 'json:"nodeParams"'
    // The active infra parameters
    InfraParams *InfraParams 'json:"infraParams"'
}
// +genclient
// +genclient:nonNamespaced
// +kubebuilder:object:root=true
// +kubebuilder:subresource:status
// +kubebuilder:resource:scope=Cluster
// QScaler is the entity responsible of making sure that a nodepool gets new VMs ASAP
when
    // pressure is detected
    type QScaler struct {
        metav1.TypeMeta 'json:",inline"'
```

TABLE 15-continued

```
    metav1.ObjectMeta 'json:"metadata,omitempty"'
    Spec QScalerSpec 'json:"spec,omitempty"'
    Status QScalerStatus 'json:"status,omitempty"'
}
// +kubebuilder:object:root=true
type QScalerList struct {
    metav1.TypeMeta 'json:",inline"'
    metav1.ListMeta 'json:"metadata,omitempty"'
    Items [ ]QScaler 'json:"items"'
}
```

TABLE 16

```
func init( ) {
      SchemeBuilder.Register(&QScaler{ }, &QScalerList{ })
}
apiVersion: qscaler.qubex.ai/v1alpha1
kind: QScaler
metadata:
    creationTimestamp: "2024-05-01T08:44:03Z"
    finalizers:
    - qscaler.qubex.ai/finalizer
    generation: 4
    name: eksctl-eksctl-isaac-nodegroup-ng-1-nodegroup-gvmb3wm25fmk
    resource Version: "741260"
    uid: 9f5d21c3-967c-421a-bb70-d87f518001d5
spec:
    maxRunningQNodes: 10
    scalingPolicy:
       active: true
       type: Unschedulable
       unschedulableScalingPolicy: { }
    source:
       template:
          spec:
             aws:
                deviceMapping:
                   /dev/xvda:
                      deviceName: /dev/xvda
                      sizeGB: 20
                      type: gp3
                imageId: ami-0b1fe9f78ee0e8142
                imdsMaxHopCount: 2
                imds Version: required
                instanceProfileArn:       arn:aws:iam::522092145756:instance-profile/eksctl-eksctl-
isaac-nodegroup-ng-1-NodeInstanceProfile-j1mQbcpPrvsu
                rootVolumeName: /dev/xvda
                securityGroupIds:
                - sg-08dd659f083f7e410
                - sg-0346f942f7b285070
```

TABLE 17

```
          zoneDetails:
             eu-central-1b:
                subnetIds:
                - subnet-056cf6a2fe60bc52c
             eu-central-1c:
                subnetIds:
                - subnet-009fc16ac6685a9a3
          instancetypes:
             instanceType: m7i.large
             maxHibernatedQNodes: 4
             instanceType: c7a.xlarge
             maxHibernatedQNodes: 3
             instanceType: c7i.xlarge
             maxHibernatedQNodes: 3
          labels:
             alpha.eksctl.io/cluster-name: eksctl-isaac
             alpha.eksctl.io/nodegroup-name: ng-1
             beta.kubernetes.io/arch: amd64
             beta.kubernetes.io/os: linux
             eks.amazonaws.com/capacity Type: ON_DEMAND
             failure-domain.beta.kubernetes.io/region: eu-central-1
             kubernetes.io/arch: amd64
```

TABLE 17-continued

```
              kubernetes.io/os: linux
              node-lifecycle: on-demand
              qubex.ai/qscaler-node: "true"
              topology.kubernetes.io/region: eu-central-1
          qCacheEpoch: 0
          target:
            clusterAutoscalerTarget:
                asgName: eksctl-eksctl-isaac-nodegroup-ng-1-NodeGroup-GvMb3wM25Fmk
              nodegroupName: ng-1
              type: ClusterAutoscalerASG
              upstreamCloudName:        eksctl-eksctl-isaac-nodegroup-ng-1-nodegroup-
gvmb3wm25fmk
      spotFailureProtectionPolicy:
        active: true
      target:
        cluster Autoscaler Target:
            asgName: eksctl-eksctl-isaac-nodegroup-ng-1-NodeGroup-GvMb3wM25Fmk
          nodegroupName: ng-1
          type: ClusterAutoscalerASG
          upstreamCloudName: eksctl-eksctl-isaac-nodegroup-ng-1-nodegroup-gvmb3wm25fmk
```

TABLE 18

```
status:
   infraParams:
      aws:
         availabilityZones:
         - eu-central-1a
         - eu-central-1c
         - eu-central-1b
         deviceMappings:
            /dev/xvda:
               deviceName: /dev/xvda
               sizeGB: 20
               type: gp3
         iamInstanceProfileArn:       arn:aws:iam::522092145756:instance-profile/eksctl-eksctl-
isaac-nodegroup-ng-1-NodeInstanceProfile-j1mQbcpPrvsu
         imageId: ami-0b1fe9f78ee0e8142
         imdsMaxHopCount: 2
         imdsVersion: required
         instanceTypes:
         - m7i.large
         rootVolumeName: /dev/xvda
         securityGroupIds:
         - sg-08dd659f083f7e410
         - sg-0346f942f7b285070
         subnets:
         - subnet-056cf6a2fe60bc52c
         - subnet-0dcle3b73e09149f9
         - subnet-009fc16ac6685a9a3
      type: AWS
   nodeParams:
      labels:
         alpha.eksctl.io/cluster-name: eksctl-isaac
         alpha.eksctl.io/nodegroup-name: ng-1
         beta.kubernetes.io/arch: amd64
         beta.kubernetes.io/os: linux
         eks.amazonaws.com/capacityType: ON_DEMAND
         failure-domain.beta.kubernetes.io/region: eu-central-1
         kubernetes.io/arch: amd64
         kubernetes.io/os: linux
         node-lifecycle: on-demand
         qubex.ai/qscaler-node: "true"
         topology.kubernetes.io/region: eu-central-1
      maxCapacity: 10
```

TABLE 19

```
RESUMETASK
   package v1alpha1
   import (
      metav1 "k8s.io/apimachinery/pkg/apis/meta/v1"
   )
   type ResumeReason string
   const (
```

TABLE 19-continued

```
    ResumeReasonSpotInterruption   ResumeReason = "spot_interruption"
    ResumeReasonSpike         ResumeReason = "spike"
    ResumeReason VerifyInstallation ResumeReason = "verify_installation"
    ResumeReasonQCacheUpdate      ResumeReason = "qcache_update"
    ResumeTaskAny AvailabilityZone = "any"
    ResumeTaskVerifyInterruptionID = "00000000-0000-0000-0000-000000000000"
)
// ResumeTaskSpec defines the desired state of ResumeTask
type ResumeTaskSpec struct {
    // The number of VMs that should be resumed
    AttemptingResumeCount int 'json:"attemptingResumeCount"'
    // The number of resumed VMs that should be allowed to join the cluster instead of
returning to hibernation
    // Used for resuming many VMs in parallel and join only the fastest ones to start into the
cluster.
    ResumeCount int 'json:"resumeCount"'
    // The name of the QNodeScaler that created this task
    QNodeScalerName string 'json:"qNodeScalerName"'
    // Shard name
    Shard string 'json:"shard"'
    // Instance type
    Instance Type string 'json:"instanceType"'
    // The availability zone in which QNodes will be resumed
    AvailabilityZone string 'json:"availabilityZone"'
    // The interruption ID that caused the resumption, optional
    InterruptionID string 'json:"interruptionID"'
    // Reason for resuming the VMs, optional
    Reason ResumeReason 'json:"reason,omitempty"
}
```

TABLE 20

```
// ResumeTaskStatus defines the observed state of ResumeTask
type ResumeTaskStatus struct {
    // internal - The number of QNodes whose resume was requested
    // +kubebuilder:default=0
    RequestedResumeCount int 'json:"requestedResumeCount"'
    // internal - The number of messages sent to the resume queue
    // +kubebuilder:default=0
    MessagesSentCount int 'json:"messagesSentCount"'
    // internal - The number of QNodes that succeeded in joining the cluster
    // +kubebuilder:default=0
    SucceededResuming int 'json:"succeededResuming"'
}
    // +genclient
    // +genclient:nonNamespaced
+kubebuilder:printcolumn:name="Resume_Count",type="integer",JSONPath=".spec.resumeCount"
    //
+kubebuilder:printcolumn:name="Requested_Resume_Count",type="integer",JSONPath=".status.requestedResumeCount"
    //
+kubebuilder:printcolumn:name="Messages_Sent_Count",type="integer",JSONPath=".status.messagesSentCount"
    // +kubebuilder:printcolumn:name="Shard",type="string",JSONPath=".spec.shard"
    //
+kubebuilder:printcolumn:name="Instance_Type",type="string",JSONPath=".spec.instanceType"
    //
+kubebuilder:printcolumn:name="Zone",type="string",JSONPath=".spec.availabilityZone"
    //
+kubebuilder:printcolumn:name="Age",type="date",JSONPath=".metadata.creationTimestamp"
    //+kubebuilder: object:root=true
    //+kubebuilder:subresource:status
    //+kubebuilder:resource:scope-Cluster
    // ResumeTask is the entity responsible of implementing the the resumption of a set of
QNodes
    // in a sophisticated way such that only the first ones to boot join the cluster.
    type ResumeTask struct {
        metav1.TypeMeta 'json:",inline"'
        metav1.ObjectMeta 'json:"metadata,omitempty"'
```

TABLE 21

```
    Spec ResumeTaskSpec 'json:"spec,omitempty"'
    Status ResumeTaskStatus 'json:"status,omitempty"'
}
```

TABLE 21-continued

```
    //+kubebuilder:object:root=true
    // ResumeTaskList contains a list of ResumeTask
    type ResumeTaskList struct {
```

TABLE 21-continued

```
        metav1.TypeMeta 'json:",inline"'
        metav1.ListMeta 'json:"metadata,omitempty"'
        Items [ ]ResumeTask 'json:"items"'
    }
    func init( ) {
        SchemeBuilder.Register(&ResumeTask{ }, &ResumeTaskList{ })
    }
```

TABLE 22

```
apiVersion: qscaler.qubex.ai/v1alpha1
kind: ResumeTask
metadata:
    creation Timestamp: "2024-05-01T19:40:39Z"
    generation: 1
    name: eksctl-eksctl-isaac-nodegroup-ng-1-nodegroup-gvmb3wm25fmk-b1f4zxqkq2
    ownerReferences:
    - apiVersion: qscaler.qubex.ai/v1alpha1
        blockOwnerDeletion: true
        controller: true
        kind: QScaler
        name: eksctl-eksctl-isaac-nodegroup-ng-1-nodegroup-gvmb3wm25fmk
        uid: 9f5d21c3-967c-421a-bb70-d87f518001d5
    resourceVersion: "889551"
    uid: 02cb7095-76bd-4279-997d-f21d4686e04f
spec:
    attemptingResumeCount: 3
    availabilityZone: any
    instanceType: c7a.xlarge
    interruptionID: 53c97b85-b78f-470e-9f1c-f56b45775f57
    qNodeScalerName: eksctl-eksctl-isaac-nodegroup-ng-1-nodegroup-gvmb3wm25fmk
    reason: spike
    resumeCount: 3
    shard: revision-0-0
status:
    messagesSentCount: 3
    requestedResumeCount: 3
    succeededResuming: 0
```

Additional or alternative nonlimiting examples for entities or CRDs may be used in different embodiments of the invention.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for allocating computer resources, the method comprising, using a computer processor:
    resuming one or more nodes of a plurality of hibernated nodes, at least two of the plurality of hibernated nodes associated with at least two different resource specifications; and
    adding one or more of the resumed nodes to a running computer cluster, wherein the adding of one or more of the resumed nodes comprises tagging one or more of the resumed nodes, the tagging to match a cluster autoscaler.

2. The method of claim 1, wherein the at least two different resource specifications include at least one of: at least two instance zones, and at least two instance types.

3. The method of claim 1, wherein one or more of the added nodes are first resumed nodes.

4. The method of claim 1, wherein the resuming is performed in response to at least one of: a shutdown notice for a running computer resource, and a pod marked unschedulable, wherein the pod specifies resources unavailable in the running cluster.

5. The method of claim 1, comprising, for a pod associated with one or more computer tasks:
    mapping one or more of the hibernated nodes to a shadow representation of the pod, the shadow representation comprising one or more resource selection parameters;
    wherein the one or more resumed nodes includes one or more of the mapped nodes; and
    wherein the adding of one or more of the resumed nodes comprises evicting one or more computer resources from the running computer cluster, the evicted resources associated with the pod, and deleting the shadow representation of the pod.

6. The method of claim 1, comprising adding one or more newly created nodes to the plurality of hibernated nodes, the adding based on a capacity for one or more of the resource specifications.

7. The method of claim 6, wherein the plurality of hibernated nodes are managed by a first software object;
wherein the adding of one or more newly created nodes is performed by the first software object; and
wherein the resuming of one or more nodes is performed by a second software object, the second software object resuming nodes managed by the first software object.

8. The method of claim 1, wherein the running computer cluster is a Kubernetes cluster.

9. The method of claim 1, comprising performing at least one computer task using one or more of the added nodes.

10. A computerized system for allocating computer resources, the system comprising:
a memory,
and a computer processor configured to:
resume one or more nodes of a plurality of hibernated nodes, at least two of the plurality of hibernated nodes associated with at least two different resource specifications; and
add one or more of the resumed nodes to a running computer cluster, wherein the adding of one or more of the resumed nodes comprises tagging one or more of the resumed nodes, the tagging to match a cluster autoscaler.

11. The system of claim 10, wherein the at least two different resource specifications include at least one of: at least two instance zones, and at least two instance types.

12. The system of claim 10, wherein one or more of the added nodes are first resumed nodes.

13. The system of claim 10, wherein the resuming is performed in response to at least one of: a shutdown notice for a running computer resource, and a pod marked unschedulable, wherein the pod specifies resources unavailable in the running cluster.

14. The system of claim 10, wherein the processor is configured to:
for a pod associated with one or more computer tasks, map one or more of the hibernated nodes to a shadow representation of the pod, the shadow representation comprising one or more resource selection parameters;
wherein the one or more resumed nodes includes one or more of the mapped nodes; and
wherein the adding of one or more of the resumed nodes comprises evicting one or more computer resources from the running computer cluster, the evicted resources associated with the pod, and deleting the shadow representation of the pod.

15. The system of claim 10, wherein the processor is configured to:
add one or more newly created nodes to the plurality of hibernated nodes, the adding based on a capacity for one or more of the resource specifications.

16. The system of claim 15, wherein the plurality of hibernated nodes are managed by a first software object;
wherein the adding of one or more newly created nodes is performed by the first software object; and
wherein the resuming of one or more nodes is performed by a second software object, the second software object resuming nodes managed by the first software object.

17. The system of claim 10, wherein the running computer cluster is a Kubernetes cluster.

18. The system of claim 10, wherein the processor is configured to perform at least one computer task using one or more of the added nodes.

* * * * *